(12) United States Patent
Gori et al.

(10) Patent No.: US 8,150,151 B2
(45) Date of Patent: Apr. 3, 2012

(54) METHOD FOR CODING PIXELS OR VOXELS OF A DIGITAL IMAGE AND A METHOD FOR PROCESSING DIGITAL IMAGES

(75) Inventors: Ilaria Gori, Genoa (IT); Marco Mattiuzzi, Grassina Bagno a Ripoli (IT)

(73) Assignee: Bracco Imaging S.p.A., Milan (IT)

( * ) Notice: Subject to any disclaimer, the term of this patent is extended or adjusted under 35 U.S.C. 154(b) by 1088 days.

(21) Appl. No.: 11/913,554

(22) PCT Filed: May 9, 2006

(86) PCT No.: PCT/EP2006/062168
§ 371 (c)(1),
(2), (4) Date: Jan. 10, 2008

(87) PCT Pub. No.: WO2006/120195
PCT Pub. Date: Nov. 16, 2006

(65) Prior Publication Data
US 2008/0212887 A1 Sep. 4, 2008

(30) Foreign Application Priority Data
May 12, 2005 (EP) ..................................... 05425316

(51) Int. Cl.
*G06T 9/00* (2006.01)
(52) U.S. Cl. .......................... 382/166; 382/232; 382/156
(58) Field of Classification Search .................. 382/166, 382/232, 156
See application file for complete search history.

(56) References Cited

U.S. PATENT DOCUMENTS 7,346,208 B2 * 3/2008 Staelin et al. ................. 382/157
2006/0098876 A1   5/2006 Buscema

OTHER PUBLICATIONS

Madiraju S V R et al: "Neural networks for robust image feature classification: a comparative study" Neural Networks for Signal Processing Y1994 IV. Proceedings of the 1994 IEEE Workshop Ermioni, Greece Sep. 6-8, 1994, New York, NY, USA,IEEE, pp. 423-430, XP010125468 ISBN: 0-7803-2026-3.

(Continued)

*Primary Examiner* — Jon Chang
(74) *Attorney, Agent, or Firm* — Themis Law

(57) ABSTRACT

A method for coding pixels or voxels of a digital or digitalized two dimensional or three dimensional image includes the steps of: providing a digital image in which each pixel or voxel is defined by a variable in a grey scale image, or by HSV or RGB values in a color image; generating a vector univocally associated to the target pixel or voxel and having components generated as a function of the values of the pixels or voxels in a window that includes the target pixel or voxel and neighboring pixels or voxels. The function of the values of the target pixel or voxel and of the pixels or voxels in the window corresponds to the characteristic parameters of the numerical matrix representing the pixels or voxels of the window or of a transformation of the numerical matrix.

38 Claims, 8 Drawing Sheets

OTHER PUBLICATIONS

Kim C-S et al: "Compact Encoding of 3-D Voxel Surfaces Based on Pattern Code Representation" IEEE Transactions on Image Processing, IEEE Inc. New York, US, vol. 11, No. 8, Aug. 2002, pp. 932-943, XP001179726 ISSN: 1057-7149.

Hladuvka J et al: "Exploiting eigenvalues of the Hessian matrix for volume decimation" 9th International Conference in Central Europe on Computer Graphics, Visualization and Computer Vision 2001. In Co-Operation With Eurographics and IFIP WG 5.10. WSCG'2001. Conference Proceedings Univ. West Bohemia Plzen, Czech Republic, vol. 1, 2001, pp. 124-129 vol. 1, XP002348842.

Srihari S N: "Representation of Three-Dimensional Digital Images" Computing Surveys, ACM, vol. 13, No. 4, Dec. 1981, pp. 399-424, XP002348843 ISSN: 0360-0300 the whole document.

* cited by examiner

Image 10x10 pixels

| P(1,1) | P(1,2) | P(1,3) | P(1,4) | P(1,5) | P(1,6) | P(1,7) | P(1,8) | P(1,9) | P(1,10) |
|---|---|---|---|---|---|---|---|---|---|
| P(2,1) | P(2,2) | P(2,3) | P(2,4) | P(2,5) | P(2,6) | P(2,7) | P(2,8) | P(2,9) | P(2,10) |
| P(3,1) | P(3,2) | P(3,3) | P(3,4) | P(3,5) | P(3,6) | P(3,7) | P(3,8) | P(3,9) | P(3,10) |
| P(4,1) | P(4,2) | P(4,3) | P(4,4) | P(4,5) | P(4,6) | P(4,7) | P(4,8) | P(4,9) | P(4,10) |
| P(5,1) | P(5,2) | P(5,3) | P(5,4) | P(5,5) | P(5,6) | P(5,7) | P(5,8) | P(5,9) | P(5,10) |
| P(6,1) | P(6,2) | P(6,3) | P(6,4) | P(6,5) | P(6,6) | P(6,7) | P(6,8) | P(6,9) | P(6,10) |
| P(7,1) | P(7,2) | P(7,3) | P(7,4) | P(7,5) | P(7,6) | P(7,7) | P(7,8) | P(7,9) | P(7,10) |
| P(8,1) | P(8,2) | P(8,3) | P(8,4) | P(8,5) | P(8,6) | P(8,7) | P(8,8) | P(8,9) | P(8,10) |
| P(9,1) | P(9,2) | P(9,3) | P(9,4) | P(9,5) | P(9,6) | P(9,7) | P(9,8) | P(9,9) | P(9,10) |
| P(10,1) | P(10,2) | P(10,3) | P(10,4) | P(10,5) | P(10,6) | P(10,7) | P(10,8) | P(10,9) | P(10,10) |

Fig. 1

Matrix of the Intensity Values of the Pixels of the Immagin 10x10 pixels

Fig. 2

| I(1,1) | I(1,2) | I(1,3) | I(1,4) | I(1,5) | I(1,6) | I(1,7) | I(1,8) | I(1,9) | I(1,10) |
|---|---|---|---|---|---|---|---|---|---|
| I(2,1) | I(2,2) | I(2,3) | I(2,4) | I(2,5) | I(2,6) | I(2,7) | I(2,8) | I(2,9) | I(2,10) |
| I(3,1) | I(3,2) | I(3,3) | I(3,4) | I(3,5) | I(3,6) | I(3,7) | I(3,8) | I(3,9) | I(3,10) |
| I(4,1) | I(4,2) | I(4,3) | I(4,4) | I(4,5) | I(4,6) | I(4,7) | I(4,8) | I(4,9) | I(4,10) |
| I(5,1) | I(5,2) | I(5,3) | I(5,4) | I(5,5) | I(5,6) | I(5,7) | I(5,8) | I(5,9) | I(5,10) |
| I(6,1) | I(6,2) | I(6,3) | I(6,4) | I(6,5) | I(6,6) | I(6,7) | I(6,8) | I(6,9) | I(6,10) |
| I(7,1) | I(7,2) | I(7,3) | I(7,4) | I(7,5) | I(7,6) | I(7,7) | I(7,8) | I(7,9) | I(7,10) |
| I(8,1) | I(8,2) | I(8,3) | I(8,4) | I(8,5) | I(8,6) | I(8,7) | I(8,8) | I(8,9) | I(8,10) |
| I(9,1) | I(9,2) | I(9,3) | I(9,4) | I(9,5) | I(9,6) | I(9,7) | I(9,8) | I(9,9) | I(9,10) |
| I(10,1) | I(10,2) | I(10,3) | I(10,4) | I(10,5) | I(10,6) | I(10,7) | I(10,8) | I(10,9) | I(10,10) |

Vector coding Pixel P(2,2) according to the State of the art $$\vec{V} = \begin{bmatrix} I(1,1) & I(1,2) & I(1,3) & I(2,1) & I(2,2) & I(2,3) & I(3,1) & I(3,2) & I(3,3) \end{bmatrix}$$

Fig. 3

Pixel vector coding State of the art $$\vec{V} = \begin{bmatrix} I(m-1,n-1) & I(m-1,n) & I(m-1,n+1) & I(m+1,n) & I(m,n) & I(m,n+1) & I(m+1,n-1) & I(m+1,n) & I(m+1,n+1) \end{bmatrix}$$

Fig. 4

WINDOW CENTERED AT I(m,n)

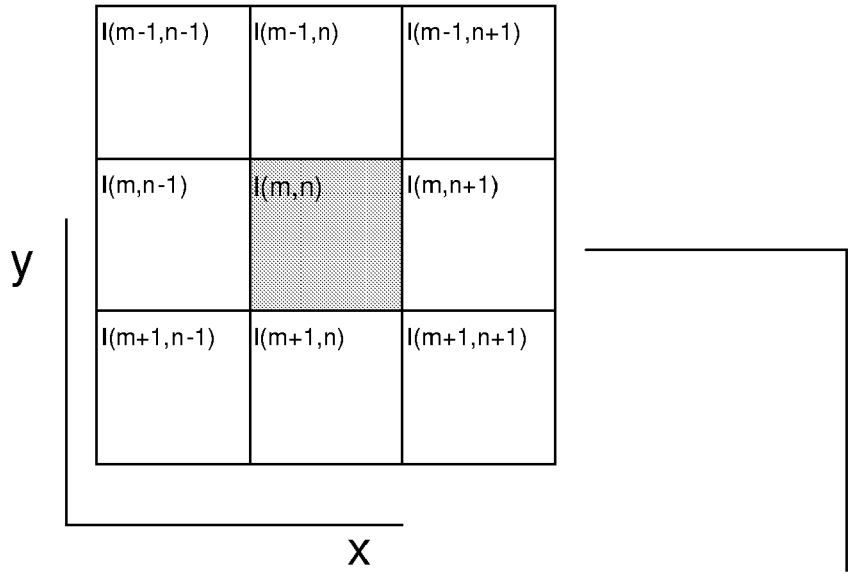

GRADIENT MATRIX

| $\sum_{p\in\{pixel\in Neighborhood\}}(\partial x)^2_p$ | $\sum_{p\in\{pixel\in Neighborhood\}}(\partial x)_p(\partial y)_p$ |
|---|---|
| $\sum_{p\in\{pixel\in Neighborhood\}}(\partial x)_p(\partial y)_p$ | $\sum_{p\in\{pixel\in Neighborhood\}}(\partial y)^2_p$ |

$$(\partial x)_P = \frac{(I_{(i,j+1)} - I_{(i,j-1)})}{2}, \quad P \equiv (i,j)$$

$$(\partial y)_P = \frac{(I_{(i+1,j)} - I_{(i-1,j)})}{2}, \quad P \equiv (i,j)$$

Fig. 5

HESSIAN MATRIX $$\begin{array}{|c|c|} \hline \left(\partial^2_{x^2}\right)_p & \left(\partial^2_{xy}\right)_p \\ \hline \left(\partial^2_{xy}\right)_p & \left(\partial^2_{y^2}\right)_p \\ \hline \end{array}$$

$$\left(\partial^2_{x^2}\right)_p = \left(I_{(i,j+1)} + I_{(i,j-1)}\right) - 2 \cdot I_{(i,j)}, \quad P \equiv (i,j)$$

$$\left(\partial^2_{y^2}\right)_p = \left(I_{(i+1,j)} + I_{(i-1,j)}\right) - 2 \cdot I_{(i,j)}, \quad P \equiv (i,j)$$

$$\left(\partial^2_{xy}\right)_p = I_{(i+1,j+1)} + I_{(i-1,j-1)} - I_{(i-1,j+1)} - I_{(i+1,j-1)}, \quad P \equiv (i,j)$$

Fig. 6

CODING ACCORDING TO THE INVENTION $$\vec{V} = \left[ \begin{array}{|c|c|c|} \hline \sigma_i \text{ OF MATRIX OF INTENSITY VALUES OF THE PIXELS OF THE WINDOW} & ?_p \text{ OF GRADIENT MATRIX} & ?_p \text{ OF HESSIAN MATRIX} \\ \hline \end{array} \right]$$

Fig. 7

METHOD FOR CODING PIXELS OR VOXELS OF A DIGITAL IMAGE AND A METHOD FOR PROCESSING DIGITAL IMAGES

FIELD OF THE INVENTION

A method for coding pixels or voxels of a digital or digitalized image and a method for processing digital or digitalized images, particularly for the recognition of the features of the imaged object applying the method for coding pixels or voxels.

More particularly, the invention relates to a method for coding pixels or voxels of a digital or digitalized two dimensional or three dimensional image that includes the steps of:

a) providing a digital image consisting in a two dimensional array of pixels or in a three dimensional array of voxels, each pixel or voxel being defined by at least one variable as its intensity in a grey scale image or the HSV (Hue, Saturation and Value) or the RGB values in a color image;

b) each pixel or voxel of the image being considered as a target pixel or voxel and for each target pixel or voxel a neighborhood being formed by a pixel or voxel windows comprising the target pixel or voxel and a certain number of surrounding pixels or voxels;

c) for each target pixel or voxel generating a vector univocally associated to the target pixel or voxel, the components of the vectors being generated as a function of the values of the target pixel or voxel and of each or a part of the pixels or voxels of the pixel or voxel window.

BACKGROUND OF THE INVENTION

Digital or digitalized images are in the form of small two or three dimensional dots having a certain appearance on the screen of a display or on a printed copy.

Each digital or digitalized image is formed by an array of the dots which are called pixels in two dimensional images and voxels in three dimensional images.

Each pixel or voxel appearance can be described by means of physical variables which is a value that is transformed in a certain visual effect by a display screen or when printed on paper.

In black and white images, such as grey scale images, the different levels of grey are univocally associated to the intensity value of the beams reflected or generated by the part of an imaged body for which a pixel of the digital or digitalized image has been acquired. The intensity of each different grey level of the grey scale is univocally related to a physical parameter of the beam reflected or emitted by the body imaged, particularly to its intensity. The physical kind of the beams can be of any nature such as electromagnetic radiation in any spectral field or acoustic radiation or other kind of beams which can be generated or reflected or diffused by imaged material.

In color images normally three different values are used for defining univocally the appearance of the pixel. Different systems are known as for example the so called HSV (Hue, Saturation, Value) or RGB (Red, Green, Blue) systems. These systems are equivalent and can be differently used for univocally describing by values the appearance of the pixels or voxels.

Pixels or voxels arrays defining digital or digitalized images can so be represented by numerical two or three dimensional matrices which univocally numerically represent the image.

Methods for coding pixels or voxels of two or three dimensional images in the form of a vector are well known and use the two or three dimensional numerical representation.

Document EP 1,345,154, discloses a method for coding pixels or voxels of digital or digitalized images which uses the numerical matrices representing the pixels or voxels of the digital or digitalized image for generating a vector representing each pixel or voxel of the image.

In this document for each pixel or voxel of the digital image which is considered as a target pixel or voxel to be coded a certain surrounding of the target pixel or voxel is defined which comprises a certain number of pixels or voxels consisting in the target pixel or voxel and in a certain number of pixels or voxels surrounding the target pixel or voxel. This window is a sub array of pixels or voxels and is represented by the corresponding sub matrix of the matrix of numerical values univocally representing the pixels or voxels of the digital image.

The vector comprises as its components the numerical values which describe the target pixel or voxel and the surrounding pixels or voxels of the window.

So for example considering a grey scale image where the value representing each pixel of the image is its intensity, and defining a window corresponding to a pixel sub array having 3×3 pixels or a voxel sub array having 3×3×3 voxels, the vector comprises respectively 9 or 27 components. Considering a color image the vector has at least three values for describing each pixel or voxel and so the numeric components of the vector are 3×3×.3=27 components for a two dimensional image and 3×3×3×3=81 components for a three dimensional image.

When a greater pixel or voxel window is used the number of components increases dramatically.

Considering now a fixed image area the resolution of the digital image is given by the number of pixels or voxels per image area. So by increasing the resolution a certain image comprises more pixels.

Thus using the coding method for example for processing digitally the image a great number of numerical data has to be processed requesting high computational power and long computational duration.

In any case the known methods give surprising results particularly for example in the field of image enhancement or image pattern recognition. The above coding method is based on the idea that the meaning of each pixel or voxel of an image with reference to the quality or feature of the part of the imaged body represented by the pixel or voxel depends mainly from the spatial relation of the numerical data of the pixel or voxel with the surrounding pixels or voxels.

In the field of digital image processing this principle has been applied for obtaining several different results.

It is known for example the use of eigenvalues of the matrices of numerical data representing a target pixel or voxel window comprising a target pixel or a target voxel of an image for somehow representing the target pixel or voxel or certain relationship of the target pixel or voxel relatively to the other pixels or voxels of the window.

Furthermore some image processing operators have been developed for recognizing edges or corners in digital images in the so called image pattern recognition methods.

These operators typically work as summarized above by defining each pixel or voxel of a digital image as a target pixel or voxel, defining further a pixel or voxel window of generic size n×m (typically n=m) comprising the target pixel or voxel and a certain number of surrounding pixels or voxels and by applying a certain transformation of the matrices of numerical values representing each pixel or voxel window.

Document "Neural Network for robot image feature classification, A comparative study" NEURAL NETWORK FOR SIGNAL PROCESSING, Y1994, IV Proceedings of the 1994 IEEE Workshop, Ermioni, Greece 6-8 Sep. 1994, New York, N.Y., USA, IEEE by Sharma V. R. Madiraju et al, discloses a feature extractor which is trained to identify features such as lines, curves, junctions or other geometrical shapes in images.

The feature extractor is based on a base of a certain number of features models generated so as to include a model for each of a wide variety of edges types. This is consistent with the aim of the technique which has to enable a robot to recognize shapes and imaged objects.

The models are 3×3 pixel windows centered on a center pixel which is the pixel of interest of a digital image. In order to describe the features in a rotational invariant way a feature descriptor is used being the eigenspace of the covariance matrix corresponding to the 3×3 pixel window.

As it appear clearly this kind of models are a sort of filter which is aimed to identify the geometrical structures present in the image by determining if a pixel of an image is part of this geometric structure or not. The so identified geometrical structures may be used for recognizing the imaged object by the shapes identified in the image. The decision of whether a pixel is part of a geometric structure or shape such as an edge, a corner, a curve or similar is made by using an artificial neural network. The result given by the neural network is merely the feature of the pixel limited to the fact that the pixel is part of an edge, part of a corner or of a line or of a curve or other geometrical structures. No information is obtained relating the quality or feature of the part of the real imaged object which is represented by the pixel in the image. The processing according to the above identified document is limited to mere "pictorial" features.

So, for example, the application of these methods to edge detection uses the so called gradient matrix defined with more detail in the following description. The use of gradient matrices is known for example in *Introductory techniques for 3-D Computer Vision*, E. Trucco and A. Verri, Prentice Hall, 1998.

Another operator called the Hessian matrix which corresponds to the second derivative of the original matrix of numerical data describing the pixel or voxel window, by means of its eigenvalue description, is used as image processing operator for example for enhancing the salient features of image detail (Jiri Hladuvka, Andreas Konig, and Eduard Groller, *Exploiting Eigenvalues of the Hessian Matrix for Volume Decimation*, In Vaclav Skala, editor, 9th International Conference in Central Europe on Computer Graphics, Visualization, and Computer Vision (WSCG 2001), pages 124-129, 2001).

Differently from the image processing method disclosed in EP 1345154, which due to the special way of encoding the pixels of an image can provide a classification of the features of a part of an imaged object represented by a pixel in the image, the edge detection methods limit their function to the classification of the pixels of an image relating to a certain geometrical structure to which the pixel belongs or that the pixel represents in the image. Thus considering the edge detection method and similar methods these are not able or directed to classify a pixel of an image in order to have an information or a prediction about the quality or feature of the part of the imaged real object which is represented by the pixel in the image. The use of the eigenvalues of the covariance matrix or other parameters of other functions of matrix of parameters related to the pixels of a window describes only a certain model of a geometrical structure to which the pixels belongs. Considering instead the method disclosed in document EP1345154 it appears clearly that the aim is to obtain information on a quality or a feature of a part of a real object which part is represented by a certain pixel in an image of the real object by processing the parameters describing the appearance of the pixel in an image representing the object. The current edge detection techniques do not deal with this technical problem, nor the models used by these methods are even suspected to be able to help in carrying out the above classification task.

In the case of a diagonalizable (2D) matrix the eigenvalues are representative of the matrix and her properties. For example, the rank, which is one of the most important properties of a (2D) matrix, is characterized by eigenvalues: in fact, for diagonalizable (2D) matrices, the number of non-zero eigenvalues is equal to the rank.

Gradient and Hessian matrices are, in particular, diagonalizable (2D) matrices, then we can characterize them by means of their eigenvalues.

This is in general not true for other (2D) matrices. By means of the present invention we can overcome this problem by considering the singular values of the (2D) matrix (D. Bini, M. Capovani, O. Menchi, *"Metodi numerici per l'algebra lineare"*, Zanichelli, Italy). In fact singular values are representative of the (2D) matrix, even if the matrix is not diagonalizable. For example, the number of non-zero singular values is equal to the rank for every (2D) matrix.

A generalization exists for 3D matrices: in fact, for a generic M×N×K 3D matrix, it is possible to find N+M+K generalized singular values characterizing the matrix (*A multilinear singular value decomposition*, Lieven De Lathauwer, Bart De Moor, Joos Vandewalle, SIAM Journal on Matrix Analysis and Applications, Volume 21, Number 4, pp. 1253-1278).

Other processing methods are used for treating image data, inter alia let us recall such methods as the wavelet transforms the autocorrelation transforms and the co-occurrence matrix transforms.

Wavelet transform is typically used for image compression.

The wavelet transforms allows to represent an image data array by a set of basis functions. The use of a subset of the basis functions allows a reduction of the parameters which are relative to the relevant image information. Thus a compression of the image data can be obtained without a significant loss of salient features.

The wavelet transform is typically calculated on a window having dimension $2^n \times 2^n$; wavelet transform of a window of any size can be calculated at the expense of loss of information at the window boundary. In order to characterize a single pixel by means of a wavelet transform we can construct 4 windows around the target pixel, these four windows having the target pixel respectively at the bottom left corner, at the bottom right corner, at the top left corner, at the top right corner, and each window having dimension $2^n \times 2^n$. We can thus code the target pixel by using one or more of the coefficients of the wavelet transform of these four numerical matrices.

The autocorrelation and the co-occurrence transforms of the image data provide a set of parameters which are somehow significant of the image texture information.

Nevertheless all the known coding methods are limited to the fact that pixels or voxels are always coded only by using the numeric values of the pixels or voxels of the neighborhood defined by a pixel or voxel window comprising a target pixel or voxel to be coded.

SUMMARY OF THE INVENTION

The present invention aims at providing a method for encoding pixels or voxels of digital or digitalized two or three dimensional images according to the steps described above and which method provides less numeric data for univocally representing a target pixel or voxel particularly for digital image processing and especially for methods for automatically recognizing qualities or features of the part of the imaged object represented by the target pixel or voxel.

According to the present invention the above aims are obtained by a method for encoding pixels or voxels of a digital or digitalized two dimensional or three dimensional image, which includes the steps of:

a) providing a digital image consisting in a two dimensional array of pixels or in a three dimensional array of voxels, each pixel or voxel being defined by at least one variable as its intensity in a grey scale image or the HSV (Hue, Saturation and Value) or the RGB values in a colour image;

b) each pixel or voxel of the image being considered as a target pixel or voxel and for each target pixel or voxel a neighborhood being formed by a pixel or voxel windows comprising the target pixel or voxel and a certain number of surrounding pixels or voxels;

c) for each target pixel or voxel generating a vector univocally associated to the target pixel or voxel, the components of the vectors being generated as a function of the values of the target pixel or voxel and of each or a part of the pixels or voxels of the pixel or voxel window; which method has been described at the beginning and in which method the function of the values of the target pixel or voxel and of each of the pixels or voxels of the pixel or voxel window corresponds to the characteristic parameters of either the numerical matrix or of a transformation of the numerical matrix representing the pixels or voxels of the window.

As already highlighted above, the present method is not limited or directed to determining if the pixels of the image belongs to a certain predetermined geometrical structure among a series of preconfigured models of different geometrical structures, but it is directed to obtain information about certain features or qualities of at least a part of a real imaged object by processing the parameters describing the appearance of the pixel representing at least the part of the real imaged object in the image. According to the invention the topologic relation between pixels of an image are analyzed by the processing method in a more extensive way and surprisingly topological information and numerical representations of the parameters univocally defining the pixel appearance also considering the relations of pixel of a certain surrounding can furnish starting data from which predicting qualities or features not of the image but of the part of the real object being imaged. This image processing method is deeply different from the currently known image processing methods since it is aimed to interpret the real world by means of its representation in an image and not in merely recognizing shapes of the imaged object.

In the present description and in the claims, the term coding or encoding has the meaning of representing numerically the appearance of a pixel in an image using a n-dimensional space of scalar parameters by which each pixel is univocally described and differentiated from other pixels of the image.

When referring to a generic matrix, any kind of characteristic parameters can be used alternatively or in combination.

A first possible set of parameters is formed by the singular values of the numerical matrix comprising the image data of the pixels or voxels of the selected window. As we said above, singular values are representative of a generic matrix.

Alternatively or in combination, the function of the values of the target pixel or voxel and of each of the pixels or voxels of the pixel or voxel window corresponds to the eigenvalues of the gradient matrix of the numerical matrix representing the pixels or voxels of the window.

Alternatively or in combination, the function of the values of the target pixel or voxel and of each of the pixels or voxels of the pixel or voxel window corresponds to the eigenvalues of the Hessian matrix of the numerical matrix representing the pixels or voxels of the window.

As a further option which can be provided alternatively or in combination of the above disclosed options, the function of the values of the target pixel or voxel and of each of the pixels or voxels of the pixel or voxel window correspond to one or more of the coefficients of the wavelet transform of the numerical matrix representing the pixels or voxels of the window.

In this case several wavelet basis functions can be chosen to be used alternatively or in combination.

A more detailed description of the wavelet transform is given in the publication available form the internet and entitled "Wavelet for Kids, A tutorial introduction" by Brani Vidakovic and Peter Mueller of Duke University. In this document the theory of wavelets is summarized and discussed and some applications to image processing are disclosed. As it appears from the chapter disclosing wavelets in image processing carrying out wavelet decomposition allow obtaining parameters. For each level of the decomposition a wavelet transform generates one matrix representing the mean and three matrices representing the so called details. From one or more of the above matrices it is possible to extract some parameters by for instance but not only taking the average of the elements of the matrix, or a second example by taking the singular values of the matrix. All of these parameters or some of these parameters can be used to form the components of a vector representing each target pixel or voxel in terms of the relationship with the surrounding pixels or voxels comprised in a selected window.

Furthermore alternatively or in combination the function of the values of the target pixel or voxel and of each of the pixels or voxels of the pixel or voxel window correspond to one or more of the coefficients of the autocorrelation transform of the numerical matrix representing the pixels or voxels of the window.

Autocorrelation in image processing is typically used as a tool for characterizing image texture and consists of a mathematical evaluation of two images. The two images can be taken either at different time instants or can be generated by shifting in space the first images and by taking the result as the second image. The autocorrelation determines the relationship between these two images. This mathematical evaluation offers the possibility of a reduction in the number of parameters to be considered in coding the target pixel or voxel.

Furthermore alternatively or in combination the function of the values of the target pixel or voxel and of each of the pixels or voxels of the pixel or voxel window correspond to the co-occurrence matrix (or her singular values) of the numerical matrix representing the pixels or voxels of the window.

The co-occurrence matrix is a two-dimensional histogram of grey levels for a pair of pixels which are separated by a fixed spatial relationship. This matrix approximates the joint probability distribution of a pair of pixels. It is typically used to compute texture measures, like contrast and entropy.

In any of the above cases the vector for coding each target pixel or target voxel has a reduced number of components if considering a pixel or voxel window having the same number of pixels or voxels as in the known coding method described above which considers as the parameters of the vector the numerical values describing each pixel or voxel comprised in the selected window.

In this case it is possible and advantageous to code each pixel or voxel as a combination of eigenvalues or singular values of the matrix of the numerical values representing the pixels or voxels of the windows and/or of the eigenvalues of the gradient matrix or of the Hessian matrix of the numerical matrix representing the pixels or voxels of the window and/or of one or more of the coefficients of the wavelet transform and/or one or more of the coefficients of the autocorrelation transform and/or one or more of the entries or singular values of the co occurrence matrix.

The relationship between the numerical values describing each target pixel or voxel and the pixels or voxels of the selected neighborhood defined by the chosen pixel or voxel windows is so summarized by the singular values and/or eigenvalues of the different transformations of the original numerical matrix consisting in the values representing simply the appearance of each pixel or voxel and/or by one or more of the coefficients of the wavelet transform and/or one or more of the coefficients of the autocorrelation transform and/or one or more of the entries or singular values of the co-occurrence matrix and in each vector this relationship is defined by different numerical values which are particularly suited for highlighting or being sensitive to certain kind of relationship between pixels or voxels of the image within the selected window.

As a further improvement, the numerical data of the matrix representing the pixels or voxels of the image can be subjected before coding to one or more preprocessing steps which in this description can be defined as preprocessing (filtering) steps.

For example a preprocessing step can be carried out for highlighting contrasts or other known image preprocessing steps can be used alternatively or in combination.

Relatively complicated or highly evolved preprocessing steps can be carried out on the digital image before carrying our coding according to the present invention.

One of these preprocessing methods consist in treating the image as described in U.S. Pat. No. 5,140,670 and makes use of the so called CNN cellular Neural Network. An alternative preprocessing method is described in document WO2005/020132 and is called ACM.

In both these cases the image data, i.e. the array of numerical values representing each one a pixel or voxel appearance of the array of pixels or voxels of the image is set equal to a knot of a neural network and the image data are processed by applying operators which sweeps the knots of the neural network or by simply let the network evolve.

In the first case typically a so called network is used and an operator is defined which sweeps the single knots of the network one after the other.

In the second case, learning functions and or activation functions are defined for the network which alter the internal state of the knots and thus their values or the connection weights and the internal values of the knots or the weights of the connections are used to modify the image data.

Such kind of preprocessing can be carried out for somehow filtering the image data in such a way as reducing or suppressing noise effects and/or in such a way that contrast or other features of the image data are enhanced.

This kind of preprocessing also operates a supervised modification of the pixel or voxels appearance of the image and in some way enhances certain relationships between pixels or voxels appearance and the object which is represented by the pixel or voxels. Thus certain parts of the image representing relevant feature or imaged objects are better recognizable in the preprocessed image so that it helps in the further classification process of the image data when the present coding method is applied in combination with a predictive algorithm for automatically recognizing qualities of the imaged objects which input data consists in the pixel or voxels of the image coded according to the method according to the present invention.

The invention relates also to a method for processing digital or digitalized images, comprising the following steps:

a) providing a set digital images of a known object, the digital images consisting in a two dimensional array of pixels or in a three dimensional array of voxels, each pixel or voxel being defined by at least one variable as its intensity in a grey scale image or the HSV (Hue, Saturation and Value) or the RGB values in a color image, each pixel or voxel of the digital image being a representation of a corresponding zone or part of the imaged object of which an interested quality or feature is known and the known quality or feature being univocally associated to the corresponding pixel or voxel of the digital image.

b) coding each pixel or voxel of the digital image or of a subset of pixel or voxel of the digital image according to one of the possible variants the method of the present invention disclosed above and univocally associating to each vector the known quality or feature of the zone or part of the imaged object to which the pixel or voxel of the image corresponds and which voxel or pixel is represented by the vector.

c) providing a predictive algorithm such as a neural network;

d) carrying out training and testing of the predictive algorithm by using as input data the vectors univocally associated to each pixel or voxels of the images of the known objects and as output data the known quality or feature of the zone or part of the imaged object to which the pixel or voxel of the image corresponds and which each one of the vectors is univocally associated;

e) providing a digital image of an object, the digital images consisting in a two dimensional array of pixels or in a three dimensional array of voxels, each pixel or voxel being defined by at least one variable as its intensity in a grey scale image or the HSV (Hue, Saturation and Value) or the RGB values in a color image, each pixel or voxel of the digital image being a representation of a corresponding zone or part of the imaged object of which the quality or feature has to be determined.

f) coding each pixel or voxel of the digital image or of a subset of pixel or voxel of the digital image according to one of the possible variants the method of the present invention disclosed above obtaining for each coded pixel or voxel a vector univocally associated to the pixel or voxel;

g) using for each or for part of the pixels or voxels of the digital image the components of the corresponding vector as input data of the predictive algorithm after it has been trained and tested;

h) determining the quality or feature of the zone or part of the imaged body corresponding univocally to the pixels or voxels which has been univocally coded by the vector the components of which has been fed as input to the predictive algorithm by the output response of the predictive algorithm (see FIG. 9).

Particularly effective algorithms are the well known Artificial Neural Networks. For a deeper understanding of these algorithm see HAYKIN S., "*Neural Networks: A Comprehensive Foundation*," Prentice Hall, Upper Saddle River, N.J., 1999. Other predictive algorithm can be used alternatively or in combination and the quality or feature of the zone or part of the imaged object corresponding to each pixel or voxel can be determined as a combination of the outputs of the different kinds of predictive algorithm.

As it appears clearly from the above the coding method according to the present invention provides less relevant data for describing relevant features of the pixel or voxel appearance in a digital image.

This is of great advantage if one considers image processing, particularly in the field of image pattern recognition or of the automatic recognition of qualities or features of the zone or part of an imaged body.

This kind of image processing is very relevant in the field of the so called CAD (Computer Aided Diagnosis). In this case images can be any kind of diagnostic images for examples Magnetic resonance images, ultrasound images, X-ray images, CT images or the like.

If the image is an analogical image, then a step of digital sampling the image is required to carry out step with known methods and devices.

In this case the quality or feature of a zone or part of the imaged body represented by a pixel or voxel in the diagnostic image can consist in the kind of tissue which the pixel represents, such as for example healthy tissue, malignant tumoral tissue or benign tumoral tissue.

Together with a reduction of the needed computational power and a shortening of the time needed to process the image data, the present method helps in coding each pixel or voxel of a digital image in such a way that the components of the vector in which the pixel is coded comprise not only the information relating to the different intensities of the pixel or voxels in a given neighbourhood of each pixel or voxel processed, but also, depending on the variant of the coding method used, different kind of information. The singular values of the image data of the pixel neighborhood provides information in a compressed manner of the relation between the intensity values of the pixels or voxels of the neighborhood of each target pixel or voxel to be coded. The eigenvalues of the gradient matrix and of the Hessian matrix of the matrix of image data provides summarized or condensed information about other features of the relationship between the pixels or voxels of the neighborhood such as the measure of the intensity change between pixels or voxels of the neighborhood, i.e. the pixels or voxels within the selected window and the intensity function curvature within the neighborhood. Wavelets transform and autocorrelation transform further provides information of different kind about the relation of the image data of the pixels or voxels of the neighborhood which at least is based on a diversity principle for determining the parameters forming the components of the vector and thus somehow enhances the accuracy.

The present coding method provides also for at least equal but generally enhanced accuracy of prediction. This is an important item, since a great problem which currently affects computer aided diagnostics is the problem of the false positives. When processing image data with a predictive algorithm form determining for example the presence of tumoral malignant tissue, among positive results, namely among the pixels or voxels which has been determined to represent in the image a malignant tumoral tissue, a certain number of the pixels or voxels in reality does not correspond to malignant tumoral tissue. It is a known issue that predictive algorithm has an high accuracy in finding malignant tumoral tissue in the sense that if there is a tissue of this kind the predictive algorithm will identify it. On the other hand beneath the so called true positives some pixel or voxel corresponding to healthy tissue are classified as malignant tumoral tissue. This is a drawback since it drags the users' attention to healthy zone therefore increasing the time for evaluation and possibly causing the user to perform unneeded biopsies in the regions wrongfully highlighted.

The enhancement of accuracy for the predictive processing of diagnostic images is of paramount importance as it reduces the need of several biopsy and the time of diagnosis.

A further improvement of the above disclosed methods may consist in the fact that to the two dimensional and three dimensional images a further dimension consisting in the time is added.

For example, instead of treating only one static image of an object, a sequence of images of the same object over a predetermined time period is considered. In this case the sequence may consist of single images acquired at different instants t1, t2 ... tk, with k integer. In this case each image is coded by means of the above disclosed functions as eigenvalues and/or singular values of the image and/or gradient and/or Hessian and/or co-occurrence matrices and/or wavelet transform parameters alternatively or in combination. The coding vector can therefore comprise as components the values at each instant of the corresponding image of the image sequence of at least one of these functions. As a second method for coding time variation in K consecutive images of size N×M is to create a 3D matrix and make use of the definition of singular values for dimensionality higher that 2D as described earlier in this text.

The method according to the present invention offers the unique advantage of coding time variation with a very limited set of parameters making therefore real-time computer aided diagnosis doable.

BRIEF DESCRIPTION OF THE DRAWINGS

A simplified example of the coding method according to the present invention in comparison to the coding method according to the state of the art is described in the following with reference to the enclosed drawings in which:

FIG. 1 is a schematic view of a digital or digitalized image being formed by an array of 10×10 pixels.

FIG. 2 is a schematic view of the image data array corresponding to the image of FIG. 1 and in which array the visual appearance of each pixel is described by numeric values, for example the intensity of the pixel in a grey scale digital image.

FIG. 3 illustrates schematically the vector used according to the state of the art for coding a target pixel by means of the numeric values representing the pixels of a selected window (illustrated in FIG. 2).

FIG. 4 illustrates schematically the pixel coding method according to the state of the art in which the components of the vector are expressed in a more generalized manner.

FIG. 5 illustrates a generic 3×3 windows centered at a target pixel with coordinates m,n, the generic gradient matrix and one possible way to calculate numeric partial derivatives. We could calculate derivatives also by using some more complex operators like Sobel operator or Frei-Chen operator (*Digital Image Processing*, W. K. Pratt, John Wiley & Sons, Inc. New York, N.Y., USA, 1991).

FIG. 6 illustrates the generic Hessian matrix and one possible way to calculate numeric second partial derivatives.

FIG. 7 illustrates schematically the vector which represents the target pixel according to the present invention.

DETAILED DESCRIPTION OF EMBODIMENTS OF THE INVENTION

Figures 8, 9:
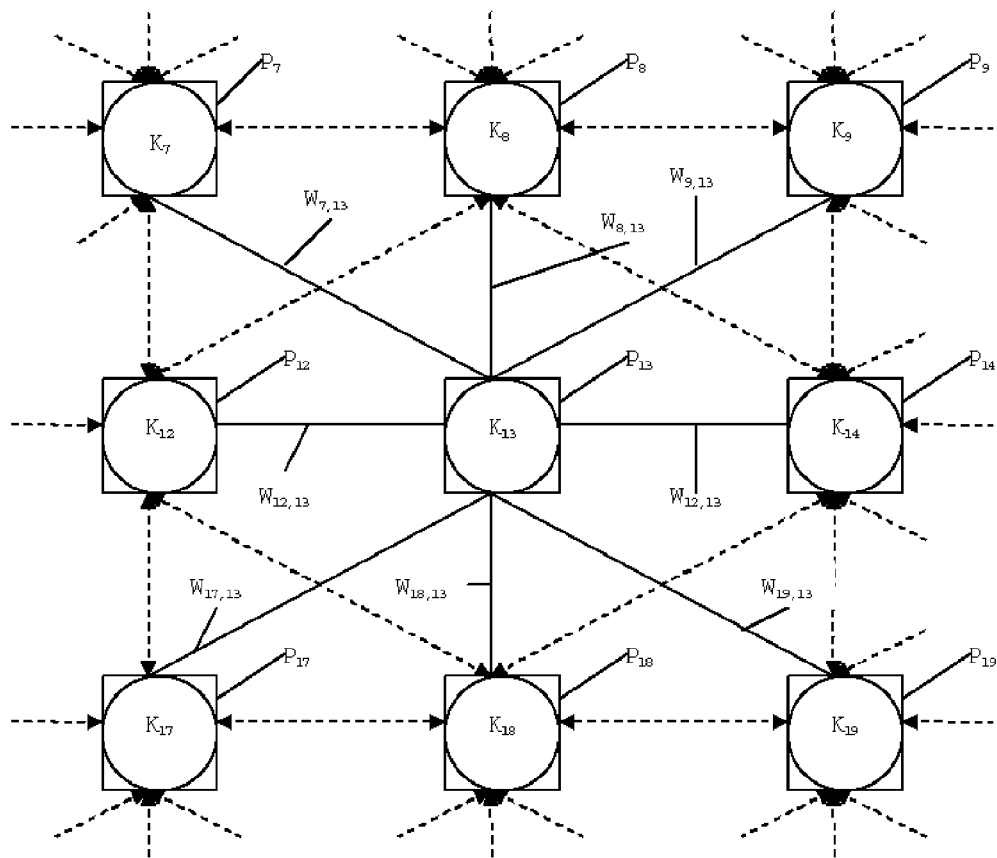
FIGS. 8 and 9 represents an image in the form of an array of pixels $P_{i,j}$ and the corresponding transformation of the array of pixels in a neural network in which each knot $K_{i,j}$ corresponds to a pixel of the image while the internal value $U_{i,j}$ of the knot $K_{i,j}$ corresponds to the numeric data representing the pixels $P_{i,j}$, which network is for carrying out image preprocessing in combination to the coding method and the image processing method of the present invention.

A digital or digitalized image is formed by an array of pixels P(n,m), with n,m=1, . . . , N. Each pixel is a small dot on a monitor or screen or on a paper print which dot has a certain appearance. The appearance of the dot can be represented by numeric data. In a so called grey scale image, each dot has a certain intensity which corresponds to a certain level of grey in the grey scale. In a color image more parameters are normally necessary in order to fully describe by numeric data the appearance of the pixel. Several systems have been defined for representing univocally the appearance of the pixel in a color image. One possible system is the so called and well known HVS (Hue, value, Saturation) or the so called RGB (Red, Green, Blue) system. In the present simplified example only the intensity I(n,m) has been indicated, since it is obvious for the skilled person that these value has to be substituted with the corresponding numeric data if a color image is processed.

So an array of numeric data I(n,m) with n,m=1, . . . , 10 as illustrated in FIG. 2 corresponds to an image comprising pixels P(n,m) with 1, . . . , 10 as the schematic array of pixels of FIG. 1 and the array of numeric data is a matrix.

Each pixel P(n,m) is univocally related to the numeric data I(n,m) which describes numerically its appearance, for instance the grey level of the pixel in a grey scale digital image.

According to the state of the art it is known to code a target pixel of an image by a vector whose components contain information also on the pixels surrounding the target pixel. Normally said surrounding region consists of a window centered at the target pixel with dimensions (2S+1)×(2S+1) pixels, where S is an integer arbitrarily defined (S=0, 1, 2 . . . , N) by the user and is here called "step".

The above definition of a window formed by surrounding pixels is equivalent to the definition of surrounding pixels of gradient x in which x is an integer and where this integer indicates the distance in steps from a target pixel to the neighboring pixels. Considering a pixel centered in the window as the target pixel, the window comprising the surrounding pixels of gradient 1 is the shell of pixels directly adjacent to the target pixels, the surrounding pixels of gradient 2 comprises the pixels of the two nearest shells of pixels surrounding the target pixels and corresponding to the one distance step from the target pixel and to two distance steps from the target pixel in each direction of the array of pixels forming the image. This definition applies correspondingly also for 3D images formed by an array of voxels.

The smallest size of said window consists in an array of pixels having 3×3 dimension and which central pixel is the target pixel, the step S is equal 1. A greater window may be chosen too such as for example 5×5 or 7×7, step S=2 and S=3 respectively. For simplicity sake in the present example a window corresponding to an array of 3×3 pixels centered at the target pixel is chosen.

This windows is illustrated in FIG. 2 with reference to the matrix of numeric data representing the pixels of the image.

The windows W comprises 9 pixels one of which is the target pixel. The window illustrated in FIG. 2 is centered at the target pixel P(2,2) and comprises the pixels P(1,1), P(1,2), P(1,3), P(2,1), P(2,2), P(2,3), P(3,1), P(3,2), P(3,3) represented by the corresponding numeric values, namely the intensities of the pixels I(1,1), I(1,2), I(1,3), I(2,1), I(2,2), I(2, 3), I(3, 1), I(3, 2), I(3, 3).

According to a known method for coding the target pixel P(2,2) using also the information about the neighboring pixels in the window W, the Intensities of the pixels are taken together with the intensity of the target pixel P(2,2) as the components of a vector representing the target pixel P(2,2) and the relation of the surrounding pixels as defined above.

The vector is illustrated schematically in FIG. 3. As it might appear clearly each vector representing a target pixel has nine components.

FIG. 4 schematically illustrates the generic expression of the vector for coding a target pixel according to the state of the art. In this case the target pixel is represented by its intensity and is defined as the pixel P(n,m) having an intensity I(n,m).

In FIG. 5 the window W which refer to the vector of FIG. 4 is illustrated and also its transformation in the so called gradient matrix. FIG. 6 illustrates the generic Hessian matrix and one possible way to calculate numeric second partial derivatives, and FIG. 7 illustrates schematically the vector which represents the target pixel according to the present invention.

As it might appear clearly to the skilled person the array of numeric values representing the pixels and in this case the array of the intensity data I(m−1,n−1), I(m−1,n), I(m−1,n+1), I(m,n−1), I(m,n), I(m,n+1), I(m+1,n−1), I(m+1,n), I(m+1,n+1) of the pixels within the window W is a two dimensional object so that two directions can be defined and the gradient in the two directions can be evaluated for each pixel in the window considered.

The gradient matrix is diagonalizable so that it can be represented by its eigenvalues $E_p$, with p=1, 2 in this case and $E_1$ and $E_2$.

The original matrix of the intensities I of pixels of the selected windows W can be further processed and the so called Hessian matrix can be computed for the original matrix. Also in this case the Hessian matrix can be represented by its eigenvalues $E_p$.

When considering the 3×3 matrix of intensities values I of the selected windows, normally the matrix will not be diagonalizable and the eigenvalues will not be meaningful as described above. So considering this more generic case the original matrix of the intensities I of the pixels of the selected windows W as illustrated in FIG. 5 can be represented by the so called singular values $\sigma_i$.

Using the singular values of the intensity matrix corresponding to the selected windows alternatively or in combination with the eigenvalues of the gradient matrix and of the Hessian matrix of the intensity matrix corresponding to the selected windows, it is possible to generate a vector for univocally coding the corresponding target pixel. The components of the vector consist in the singular values of the matrix of the intensity values corresponding to the pixels of the selected window and to the eigenvalues of the gradient matrix and of the Hessian matrix obtained by processing the matrix of the intensity values corresponding to the pixels of the selected window.

The object of the present invention allows therefore to represent the relationships of the target pixel with respect to its surrounding pixels comprised in the selected windows in a very condensed form in the coding vector without the loss of performance in the overall predictive function of the proposed method.

This difference becomes increasingly bigger when selecting windows comprising a higher number of surrounding pixels.

Although the example illustrated is limited to a particular choice of transformations of the original matrix of the intensity values corresponding to the pixels of the selected window, as it has been disclosed above, further transformations can be applied alternatively or in combination. So for example a wavelet decomposition can be carried out and the mean and detail values can be used all or at least a part of them as components of the coding vector of the target pixel.

Alternatively or in combination the autocorrelation transform of the original matrix of the intensity values corresponding to the pixels of the selected window can be used and the parameters obtained can be used all or at least some of them as components of the vector for coding the target pixel.

Wavelet transform can also be used as preprocessing steps. The matrices of numeric data obtained can be then processed with the corresponding gradient matrix and/or the corresponding Hessian matrix and their singular values and/or eigenvalues alternatively or in combination can be determined.

According to still another improvement the digital image can be first submitted to processing by means of a so called Cellular automata. Document U.S. Pat. No. 5,140,670 and document "Cellular Neural Networks: Application" by Leon o. Chua and Ling Yang, I.E.E.E. Trans. On Circuits & Systems, vol. 35 (1988) October, No. 10, New York, N.Y., US discloses a combination of a so called cellular automata and neural networks This new kind of information-processing system is a large scale non linear analog circuit like neural networks, which circuits processes signal in real time. Like cellular automata it is made of a massive aggregate of regularly spaced circuits clones, called cells, which communicate with each other directly only through its nearest neighbors. Cells not directly connected together may affect each other indirectly because of the propagation effects of the continuous-time dynamics of cellular neural network. The cellular neural networks are able to carry out feed-back and feed-forward operations. The connections among cells are uniform and local. This means that a cellular neural network can be characterized by templates of its feed-back and feed forward operators. These operators define the dynamic behavior of the cellular neural network. These operators are finite constants or square matrices of coefficients, so called cloning template which defines the dynamic rule of the cellular neural network. Thus in a cellular neural network different kind of operators can be used which are predefined and independent of the particular values of the data of the array of data to be processed. Each operator being specifically defined in order to carry out a particular operation of the data for extracting or highlighting features from the data or relations among the data. Normally a library of such operator templates, so called genes, is provided from which one or more operator templates are chosen and used to carry out the data processing desired. So for example when considering a two dimensional image an operator or a gene can be provided for detecting and highlighting edges, a further operator or gene can be provided for sharpening and so one. The operators can be sequentially used for processing the data in order to obtain a combination of their effects on the output image.

Figure 10:
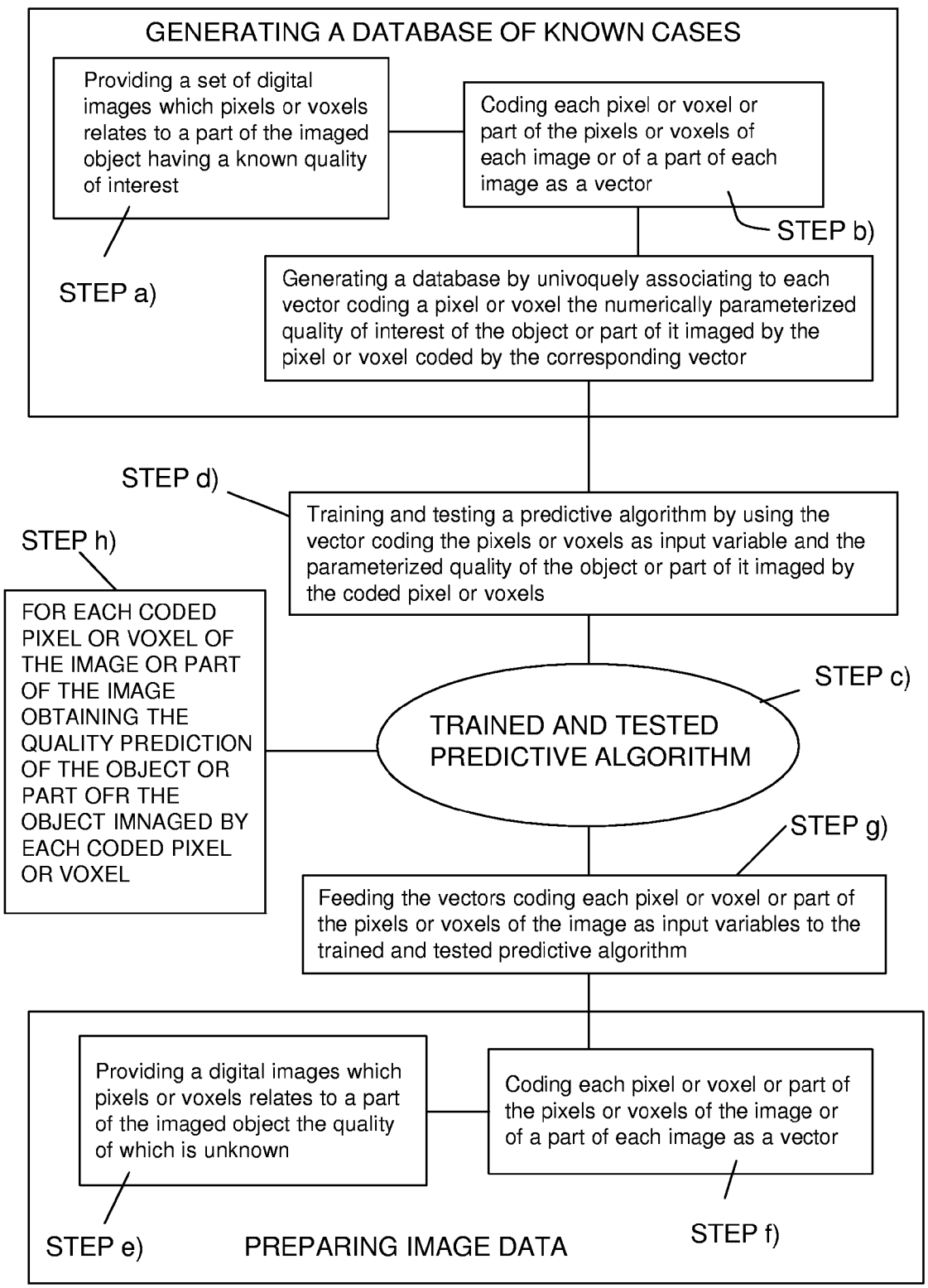
FIG. 10 illustrates a flow diagram of a generic combination of the coding method according to the present invention with a predictive algorithm for automatic recognition of the quality of the part of the imaged object corresponding to one or more of the pixels or voxels of the image.

A different approach makes also use of an artificial neural network comprising a n-dimensional array of cells ($K_i$) corresponding to the knots of the neural network, each cell having connections to the directly adjacent cells ($K_j$) forming the neighborhood of the a cell ($K_i$), see FIGS. 8 and 9. FIG. 10 illustrates a flow diagram of a generic combination of the coding method according to the present invention with a predictive algorithm for automatic recognition of the quality of the part of the imaged object corresponding to one or more of the pixels or voxels of the image.

Each cell ($K_i$) has an input for each connection to a directly adjacent cell of the surrounding cells ($K_j$). Furthermore each cell ($K_i$) has an output for the connection to one or more of the directly adjacent cells ($K_j$). The connection between each cell ($K_i$) and the directly adjacent cells is determined as usual in neural networks by weights ($w_{ij}$). Each cell is further characterized by an internal value defined as the activation value or function ($A_i$) of the cell ($K_i$) and each cell ($K_i$) is able to carry out signal processing according to a signal processing function so called transfer function for generating a cell output signal ($u_i$). The transfer function determining the output signal ($u_i$) of a cell ($K_i$) as a function of the activation value or function ($A_i$) of the cell ($K_i$), which transfer function comprises also the identity function which puts the activation value or function ($A_i$) of the cell ($K_i$) equal to the output signal ($u_i$) of a cell ($K_i$).

Providing a n-dimensional database of input data records ($P_i$) which has to be submitted to computation by means of the neural network and in which n-dimensional database the relative position of the data records ($P_i$) when projected in a corresponding n-dimensional space is a relevant feature of the data records ($P_i$), the data records ($P_i$) of the database can be represented by an array of points in the n-dimensional space, each point having a defined position in the array of points and being related to a data record ($P_i$) of the database, each data record ($P_i$) of the database comprising further at least one variable or more variables each one having a certain value ($U_i$). Each data record ($P_i$) is associated to a cell (Ki) of the n-dimensional array of cells forming the neural network which cells ($K_i$) have the same position in the n-dimensional array of cells ($K_i$) as the corresponding data record ($P_i$) represented by a point in the n-dimensional array of points. The value ($U_i$) of the variables of each data record ($P_i$) being considered as the initialization value of the network being taken as the initial activation value ($A_i$) or the initial output value ($u_i$) of the associated cell ($K_i$). The activation value ($A_i$) or the output value ($u_i$) of each cell ($K_i$) after a certain number of iterative processing steps of the neural network being considered as the new value ($U_i$) for the associated data records ($P_i$).

According to this approach, for each processing step of the certain number of iterative processing steps, the weights ($w_{ij}$) defining the connection between each cell ($K_i$) and the directly adjacent cells ($K_j$) are determined as the function of the current values ($U_j$) of the variables of each data record ($P_j$) associated to the cell ($K_j$) directly adjacent to the cell ($K_i$), the function being a so called learning function or rule. The current activation value ($A_i$) or the output value ($u_i$) of each cell ($K_i$) after a processing steps of the neural network which is considered as the current new value ($U_i$) for the associated data records ($P_i$) is determined as a function of the current output values ($u_j$) of the directly adjacent cells ($K_j$) weighted by the corresponding weight ($w_{ij}$) defining the connection of the directly adjacent cells ($K_j$) with the cell ($K_i$).

As a variant the above mentioned artificial neural network can be modified by determining the current activation value ($A_i$) or the output value ($u_i$) of each cell ($K_i$) after a processing steps of the neural network which is considered as the current new value ($U_i$) for the associated data records ($P_i$) as a function of the of the weights ($w_{ij}$) defining the connection of the directly adjacent cells ($K_j$) with the cell ($K_i$), the function being a so called activation function or rule.

The current activation value ($A_i$) or the output value ($u_i$) of each cell ($K_i$) after a processing steps of the neural network which is considered as the current new value ($U_i$) for the associated data records ($P_i$) can be determined as a function of the current output values ($u_j$) of the directly adjacent cells ($K_j$) and of the corresponding weight ($w_{ij}$) defining the connection of the directly adjacent cells ($K_j$) with the cell ($K_i$), the function being a so called activation function or rule.

Furthermore for each processing step of the certain number of iterative processing steps, the weights ($w_{ij}$) defining the connection between each cell ($K_i$) and the directly adjacent cells ($K_j$) are determined as the function of the current values ($U_j$) of the variables of each data record ($P_j$) associated to the cell ($K_j$) directly adjacent to the cell ($K_i$) and of the current value ($U_i$) of the variables of the data record ($P_i$) associated to the cell ($K_i$).

When the database is formed by the pixels of a two dimensional image, then the above neural network forms a machine for image processing according to the present invention.

So referring to the example illustrated in the schematic view of the figures if one considers that the initial internal value of each knot of the neural network is set equal to the intensity value I(n,m) of the corresponding pixel P(m,n), depending on the kind of activation function or learning function used the internal state of each knot will change at each processing step and this corresponds to a new intensity value of the corresponding pixel. The image is thus subjected to vary its appearance according to certain rules defined with the activation or learning functions.

Additional methods or corresponding algorithm for pre-processing the image data can also be used such as for example processing the image data with clustering algorithm.

The above disclosed preprocessing can be interpreted as a filtering process of the image which can lead to enhancement of some information contained in the image and suppression of other information which has no meaning relating to the prediction output, in this case the quality or feature of the tissue of the imaged object.

The reduction of the numeric data for coding pixels of a digital or digitalized image according to the present invention is very useful for reducing the computational power and the duration of processing of said images. A particular field is the so called CAD (Computer Aided Diagnosis). Within this technical field a very important item consist in recognizing automatically from the image, typically a grey scale MRI image or an ultrasound or a radiographic image the quality or feature of the part of an imaged object which correspond to one or more pixels of the image. A special case is directed to the automatic classification of the quality or feature of a biological tissue as belonging to healthy or tumoral tissue.

Predictive algorithms such as artificial neural networks are used to do this automatic classification.

Artificial neural networks are well known see for example Kishan Mehrotra, Chilukuri K. Mohan, Sanjay Ranka, "*Elements of Artificial Neural Networks*", A Bradford Book, The MIT Press Cambridge, Mass., 1997.

According to current state of the art see for example document WO03077182, in order to carry out an automatic recognition of the quality or feature of a tissue (healthy or tumoral tissue) of a biologic object form a diagnostic image, each pixel of the image or a part of the pixels are coded as described in FIGS. 3 and 4 by a vector which comprises as components the numeric value corresponding to the intensity of the pixel to be coded and the numeric values corresponding to the intensities of the pixel surrounding the pixel to be coded (target pixel) which makes part of a selected window i.e. a selected sub-array of pixels surrounding the pixel to be coded.

An Artificial Neural Network is provided having at least one input knot for each of the vector components and two output knots corresponding to two numeric values which are univocally related to the feature of the tissue as for example the values (0,1) for healthy tissue and the value (1,0) for tumoral tissue. Several hidden layers are provided. The Neural Network is trained and then iteratively tested by using a database of diagnostic images of known biologic objects, the feature (healthy or tumoral tissue) of each zone of the imaged objects corresponding to each pixel of the image being known and being univocally associated to the corresponding pixel. A fraction of the data (typically ½) of the database is used to train the Artificial Neural Network and a different fraction of the data of the database is used to test the predictive algorithm.

Other kinds of predictive algorithm can be used in combination with the pixel coding method according to the present invention. It is also possible to combine the results of two or more different predictive algorithm or for example of two or more artificial neural networks being trained and then tested according to different datasets or to different distributions of a database on a training and testing set.

FIG. 9 illustrates a flow diagram relating to a generalization of the method for processing digital or digitalized images.

The first phase consists in generating a database of known cases and in training and testing a predictive algorithm such as an artificial neural network. This phase comprises the steps of:

a) providing a set of digital images of a known object, the digital images consisting in a two dimensional array of pixels or in a three dimensional array of voxels, each pixel or voxel being defined by at least one variable as its intensity in a grey scale image or the HSV (Hue, Saturation and Value) or the RGB values in a color image, each pixel or voxel of the digital image being a representation of a corresponding zone or part of the imaged object of which an interested quality or feature is known and the known quality or feature being univocally associated to the corresponding pixel or voxel of the digital image.

b) coding each pixel or voxel of the digital image or of a subset of pixel or voxel of the digital image according to one of the possible variants of the method of the present invention disclosed above and univocally associating to each vector the known quality or feature of the zone or part of the imaged object to which the pixel or voxel of the image corresponds and which voxel or pixel is represented by the vector.

c) providing a predictive algorithm such as a neural network;

d) carrying out training and testing of the predictive algorithm by using as input data the vectors univocally associated to each pixel or voxels of the images of the known objects and as output data the known quality or feature of the zone or part of the imaged object to which the pixel or voxel of the image corresponds and which each one of the vectors is univocally associated.

The second phase consist in acquiring a digital image or in digitalizing an image and in coding each pixel or voxel of the image or part of the pixel or voxel of the image or of a part of the image and feeding the coded pixels or voxels to the trained and tested predictive algorithm. This second phase consist in the following steps:

e) providing a digital image of an object, the digital images consisting in a two dimensional array of pixels or in a three dimensional array of voxels, each pixel or voxel being defined by at least one variable as its intensity in a grey scale image or the HSV (Hue, Saturation and Value) or the RGB values in a colour image, each pixel or voxel of the digital image being a representation of a corresponding zone or part of the imaged object of which the quality or feature has to be determined.

f) coding each pixel or voxel of the digital image or of a subset of pixel or voxel of the digital image according to one of the possible variants the method of the present invention disclosed above obtaining for each coded pixel or voxel a vector univocally associated to the pixel or voxel;

g) using for each or for part of the pixels or voxels of the digital image the components of the corresponding vector as input data of the predictive algorithm after it has been trained and tested.

Thus using the algorithm the last step consist in:

h) determining the quality or feature of the zone or part of the imaged body corresponding univocally to the pixels or voxels which has been univocally coded by the vector the components of which has been fed as input to the predictive algorithm by the output response of the predictive algorithm.

The method of coding according to the present invention and the method for processing such coded image data has been tested in some experiments using digitalized images of different tissues and classifying the tissue kinds by means of a predictive algorithm. The results obtained by the pixel coding method according to the present invention has been compared to the results obtained for the same digitalized images by using the above disclosed classical pixel vector coding method. The comparison has demonstrated better fitness scores for the pixel coded according to the present invention and higher computational speeds.

A further improvement of the method for processing digital or digitalized images, particularly for recognition of the features of the imaged object applying the method for coding pixels or voxels is provided by the present invention and is hereinafter disclosed.

Figure 11:
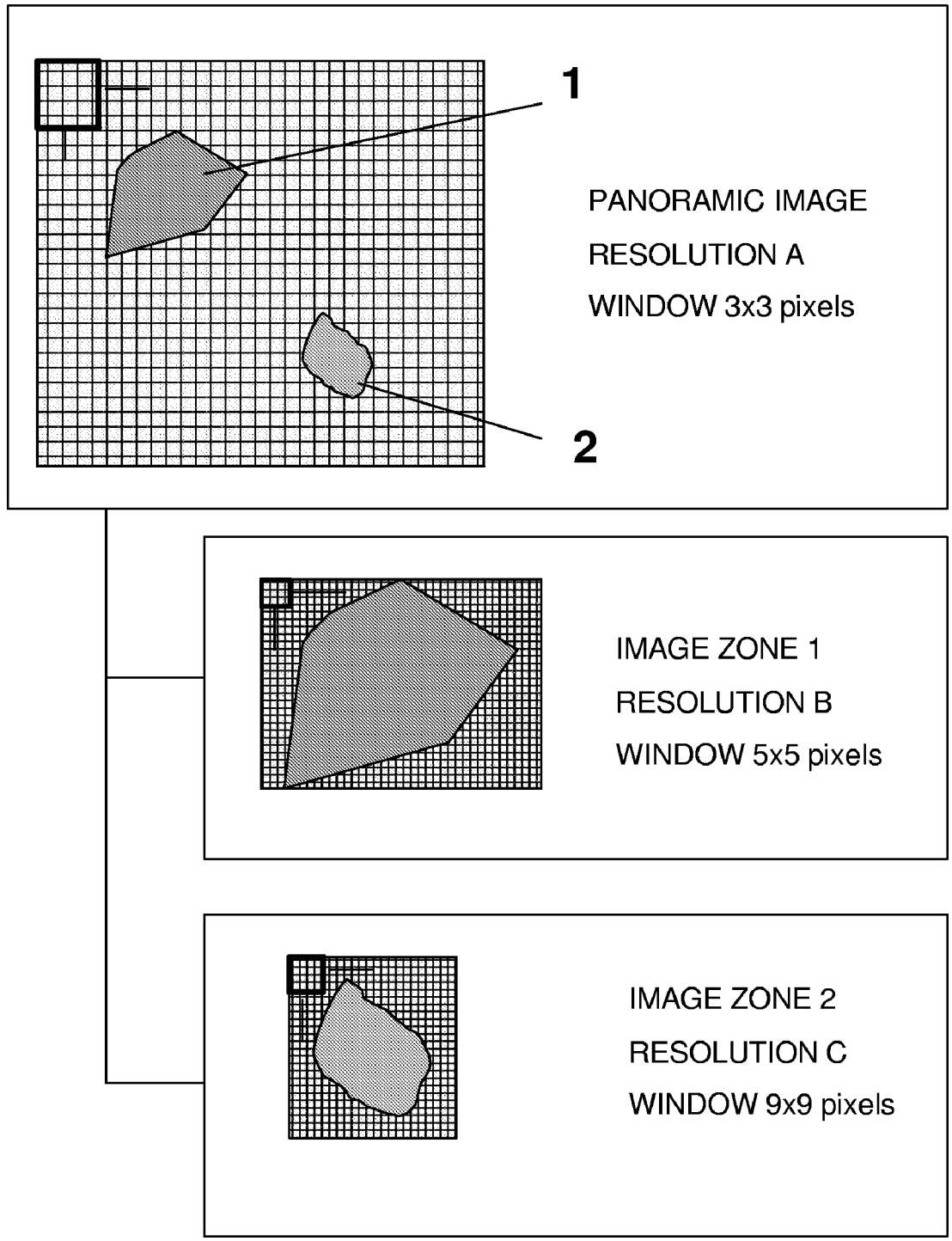
FIG. 11 illustrates a further enhancement of a method for automatically predicting the quality of the part of the imaged object corresponding to one or more of the pixels or voxels of the image in combination with the method for coding imaged data according to the present invention.

Referring to FIG. 11, the improvement comprising the following steps of:

Defining a first window for carrying out the pixel or voxel coding, the windows being formed by an array of pixels or voxels surrounding the target pixel or voxel to be coded which has a first dimension relating to the number of pixels of the window;

Carrying out the coding of the pixels or voxels;

Providing a trained predictive algorithm and carrying out a first processing of an image by means of the coded pixels or voxels according to the above defined first window, thus determining the feature or quality of each pixel or voxel in the image;

Identifying the pixels or voxels in the image having a certain quality and their position in the image;

Defining sub-arrays of pixels or voxels which corresponds to zones or parts of the original image in which the pixels or voxels having the certain quality are present;

Defining a second window for carrying out the pixel or voxel coding, the windows being formed by an array of pixels or voxels surrounding the target pixel or voxel to be coded which has a second dimension relating to the number of pixels of the window which dimension and number of pixels or voxels is bigger than that of the first window;

Carrying out the pixel or voxel coding only for the pixels or voxels of the above defined sub-arrays of pixels or voxels which corresponds to zones or parts of the original image in which the pixels or voxels having the certain quality are present;

Carrying out a second processing of the coded pixel or voxels coded by using the second window with the trained and tested algorithm for determining the feature or quality of the pixels or voxels of the sub-arrays of pixels or voxels which corresponds to zones or parts of the original image in which the pixels or voxels having the certain quality are present according to the first processing step with the predictive algorithm.

Additional Steps can Obviously Carried Out by: Identifying the pixels or voxels in the image having a certain quality or features according to a preceding processing step with a predictive algorithm and their position in the image;

Defining sub-arrays of pixels or voxels which corresponds to zones or parts of the original image in which the pixels or voxels having the certain quality are present;

Defining a new window for carrying out the pixel or voxel coding, the window being formed by an array of pixels or voxels surrounding the target pixel or voxel to be coded which has a dimension relating to the number of pixels of the window which dimension and number of pixels or voxels is different than that of the window defined in the preceding processing step;

Carrying out the pixel or voxel coding only for the pixels or voxels of the above defined sub-arrays of pixels or voxels which corresponds to zones or parts of the original image in which the pixels or voxels having the certain quality are present;

Carrying out a further processing of the coded pixel or voxels coded by using the new window with the trained and tested algorithm for determining the feature or quality of the pixels or voxels of the sub-arrays of pixels or voxels which corresponds to zones or parts of the original image in which the pixels or voxels having the certain quality are present according to the preceding processing step with the predictive algorithm;

The different windows for coding the pixels or voxels are to be used also for coding the pixels or voxels of the dataset for training and testing the predictive algorithm for a certain corresponding processing step with the algorithm so that a correspondence exists between the window used for coding the pixels or voxels of the images of the training and testing dataset and the pixels or voxels of the image which has to be processed.

According to another improvement which can be applied either alternatively or in combination with the above disclosed one, at each coding step of the pixels or voxels of the image to be processed or of the pixels or voxels which corresponds to zones or parts of the original image in which the pixels or voxels having the certain quality or feature according to the preceding processing step with the predictive algorithm are present all or only part of the parameters obtained by further transformations applied to the original matrix comprising the numeric data, i.e. the intensity values, of the pixels or voxels of the sub-array of pixels or voxels can be added to the components of the pixel or voxel coding vector.

For example for a first predictive processing step the pixel or voxel to be processed are coded using the singular values of the matrix of the intensities values the eigenvalues of the gradient matrix and the eigenvalues of the Hessian matrix of the matrix of the intensities of the pixel or voxel of the selected window, while for a subsequent processing step of the predictive algorithm in which only the pixels or voxels of one or more sub-arrays of pixels or voxels are processed which sub-arrays correspond to zones or parts of the original image in which the pixels or voxels having the certain quality are present according to the first processing step with the predictive algorithm, the pixels or voxels are represented by further numeric data corresponding to all or part of the parameters furnished by one or more further transforms of the matrix of the intensities of the pixels or voxels of the defined window. Such further transform of the matrix of the intensities being for example an autocorrelation transform or a wavelet transform.

This variant can be applied alternatively to varying the dimension of the window or in combination with a variation of the dimension of the window.

In combination with the above mentioned methods, when in a first step an entire image is coded and processed with a predictive algorithm thus obtaining the pixels or voxels which represents parts of an imaged object having the desired qualities, one or more image zones can be defined corresponding to only part of the original image which can be indicated as the panoramic image. In this case as disclosed above, the resolution of the parts or zones of the panoramic image can be the same resolution as the one of the panoramic image. Alternatively new images at least only of the parts or zones or an entire new panoramic image can be acquired with a higher resolution. Due to the fact that the parts or zones of the panoramic images are smaller than the panoramic image, i.e. correspond to smaller field of view, the processing of the image data relating to the zones or parts of the panoramic image will not result in a too high number of variables to be processed event if the resolution has been enhanced.

The windows defining the pixels of the surrounding of each target pixel can also be varied in its dimensions by reducing or increasing the number of surrounding pixels or voxels to be considered in coding each target pixel or voxel.

FIG. 11 gives a very simplified example in order to illustrate the principle. A first panoramic image is acquired and treated with the method for coding pixels or voxels and with the method for image processing according to the present invention. In this case a windows W has been defined of 3×3 pixels. The processing of the image shows that the searched qualities of the imaged object have been found in the two zones 1 and 2.

According to the above disclosed variants two images can be defined which have a reduced dimension relatively to the panoramic image and which comprises entirely or at least par of the zone 1 and of the zone 2 of the panoramic image. In FIG. 11, these two images are indicated as Image zone 1 and image zone 2.

In a first variant the two images having reduced dimensions and comprising the two zones 1 and 2 of the panoramic images are simple cut outs and the two images has the same resolution of the panoramic image. The only variant relates to the fact that the windows of the surrounding pixels of each target pixel has been increased respectively to a dimension of 5×5 pixels and to a dimension of 9×9 pixels centered at each target pixel.

In this case the fact that the dimension of the windows of the pixels surrounding the target pixel has been increased is balanced by the fact that each image zone has a reduced number of pixels being a simple cut out of the panoramic image.

The alternative illustrated in FIG. 11 provides further the fact of enhancing the resolution of the two image zones which is applied in combination with defining windows of surrounding pixels having an increased dimension in relation to the one used in the first processing step carried out on the panoramic image. In this case the increased resolution is identical for both image zones 1 and 2, but this is not necessary at all and the image zones 1 and 2 could be chosen to have different increased resolutions relatively to the panoramic image. In any case it has also to be considered that generally an increased resolution is to be considered desirable, but the disclosed method has not to be considered limited to this since it also could be possible that at least one image zone 1 or 2 will be chosen to have a lower resolution than the panoramic image.

Considering new resolutions of at least one of the images indicated in FIG. 2 as image zone 1 and 2, than it is passable to define windows of surrounding pixels for coding the pixels of the image zones and for processing the image which have the same dimension as the one used in processing the panoramic image. Alternatively the change in resolution of the image zones 1 and 2 with respect to the panoramic image can be provided in combination also with a change in the dimension of the windows of the surrounding pixels which can be identical or even different for each image zone.

Obviously when the images corresponding to the cut outs of the panoramic image must have an increased resolution a new digitalization or a new image acquisition with the corresponding reduced field of view relating to each zone of the object to be imaged corresponding to the cut outs has to be carried out.

Figure 12:
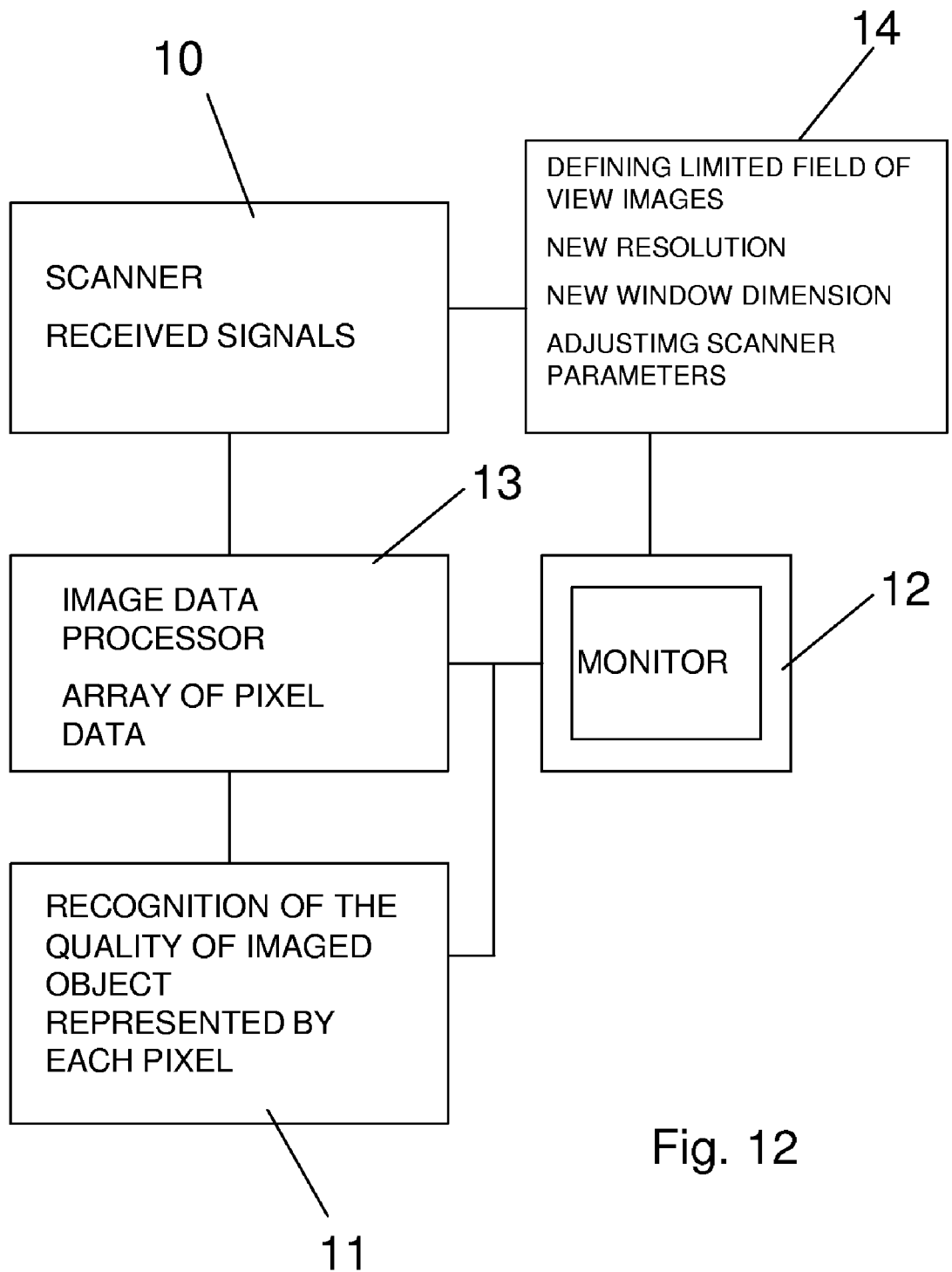
FIG. 12 illustrates a block diagram of a scanner for acquiring images of objects in combination with means for automatically predicting the quality of the part of the imaged object corresponding to one or more of the pixels or voxels of the acquired images.

FIG. 12 illustrates a block diagram of a imaging device which is provided with means for processing the acquired images in order to identify the quality of the imaged objects and with which it is possible to carry out the above mentioned method steps in any of the disclosed variants.

The imaging device comprises a scanner 10 for acquiring imaged data for example by excitation, reflection or transmission by the imaged body. The received signals by the scanner are fed to an image processor 11 which processes the received signals in order to obtain imaged data which can be represented as arrays of pixels on a monitor 12.

A further unit 13 is provided which processes the image data in the form of the parameters identifying the appearance of the image pixels according to one or more of the disclosed variants of the combination of the method for coding image pixels according to the present invention and of the method for identifying the quality of the object zones represented by the image pixels according to one or more of the preceding variants. The quality of the imaged part of the object represented by the pixels of the image can be highlighted in the image printed on the monitor by associating univoquely to certain qualities or to a certain searched quality certain particular aspects of the pixels on the monitor.

The user can then define cutouts of the viewed image comprising the pixels of the viewed image having the searched qualities. This smaller images consisting in the cutouts can be then processed by the means 13 by defining new window dimensions of the window of surrounding pixels used for coding each pixel or the scanner can be set automatically for acquiring an image only of the defined cutouts by limiting the field of view to the dimension of each one of the cutouts. New resolution can also be defined for the mew images to be acquired with the reduced field of view.

Considering that the image processor 12 used for generating the image data from the received signals is often formed by a computer, the further processing unit 13 for coding the pixels of the image and automatically recognizing the quality of the part of the imaged object represented by each pixel can be in the form of a software means to be executed by the computer. Also the means 14 allowing the definition of the cutouts and or the setting of a new resolution and or new dimensions of the windows of the surrounding pixels and for adjusting the parameters of the scanner 10 accordingly can consist in a software means to be executed by the computer.

In the above example the processing unit 13 for coding the pixels of the image and carrying out the quality recognition of the parts of the imaged object represented by each pixel and the unit 14, are internal units of the imaging apparatus which may consist in electronic units and software means or only executable software means when the imaging apparatus comprises a computer. Alternatively the units 13 and 14 can be in the form of an external image processing system comprising a computer hardware and executable software means which can be executed by the computer hardware in order to carry out the functions of the processing unit 13 and/or of the unit 14 and which system has an interface for communicating with a corresponding interface of the imaging apparatus.

Although the present description and the example have been carried out with reference to only the two dimensional case, it is obvious for the skilled person that the above steps can be applied also to a case where the image is a three dimensional array of voxels.

According to a further variant of the method for coding a pixel or a voxel of an image, it is also possible to define the components of a vector coding the pixel or the voxel by using the value or the values of the parameter defining the appearance of the pixel or the voxel obtained as a result of two, three or more filtering steps of the image.

In this case, two, three or more filtering algorithms are applied to the image data, i.e. to the array of data representing the array of pixels or voxels of the image and defining their appearance.

Each filtering algorithm carries out a transformation of the data, i.e. of the values of the parameters defining the appearance of each pixel or voxel. So considering m different filtering or preprocessing algorithm carried out on the original image data, also m transformations f1, f2, ..., fm will be carried out on the original values of the parameters defining the appearance of each pixel or voxel. In this case a modified way of defining a coding pixel can be carried out. Considering for example a generic pixel P(i,j) of an image, and the above m transformations f1, f2, ..., fm, a corresponding set of modified, i.e. filtered, values of the parameters representing the appearance of the pixel will be obtained by carrying out the transformations on the pixel P(i,j), which can be defined as f1(P(i,j)), f2(P(i,j)), ..., fm(P(i,j)). Applying the method according to the present invention by defining a pixel window limited to the pixel P(i,j) being subjected to the transformations, the above defined set of modified values of the parameters defining the appearance of the pixel f1(P(i,j)), f2(P(i,j)), ..., fm(P(i,j)) can be used as components of a vector for coding the pixel P(i,j).

It is important to consider that since many filtering methods as for example the ones described or cited in the above description uses also windows defining a pixel surrounding of each target pixel subject to transformation or processing the relation of the target pixel with the surrounding pixel is not lost using this variant.

As a further variant based on the fact that most or generally all the filtering methods or preprocessing methods of the pixels of the image uses for treating each target pixel a window containing the target pixel and a certain predefined number of surrounding pixels and thus defines a matrix of image data corresponding to the windows instead of using the modified values of the parameter describing the appearance of the target pixel as a component of a vector for coding the target pixel as described above it is possible to use any one or combinations of any one of the transformations of the coding method according to the invention applied to the matrix corresponding to the window defined in the filtering or preprocessing step. Thus instead of using as a component of a vector for coding a pixel P(i,j) the values of the parameter describing its appearance as modified by the filtering or preprocessing algorithm one of the values or a combination of the values can be used:

the singular values of the numerical matrix comprising the image data of the pixels or voxels of the selected window for carrying out each of the filtering or preprocessing steps;

the eigenvalues of the gradient matrix of the numerical matrix representing the pixels or voxels of the window for carrying out each of the filtering or preprocessing steps;

the eigenvalues of the Hessian matrix of the numerical matrix representing the pixels or voxels of the window for carrying out each of the filtering or preprocessing steps;

one or more or a combination of the coefficients of the wavelet transform of the numerical matrix representing the pixels or voxels of the window for carrying out each of the filtering or preprocessing steps. Several wavelet basis functions can be used alternatively or in combination;

the so called co-occurrence transform of the matrix representing the pixels or voxels of the window for carrying out each of the filtering or preprocessing steps.

one or more of the coefficients of the autocorrelation transform of the numerical matrix representing the pixels or voxels of the window for carrying out each of the filtering or preprocessing steps;

a combination of eigenvalues or singular values of the matrix of the numerical values representing the pixels or voxels of the windows for carrying out each of the filtering or preprocessing steps and/or of the eigenvalues of the gradient matrix or of the Hessian matrix of the numerical matrix representing the pixels or voxels of the window for carrying out each of the filtering or preprocessing steps and/or of one or more of the coefficients of the wavelet transform and/or one or more of the coefficients of the autocorrelation transform and/or of the singular values of the co occurrence matrix of said numerical matrix representing the pixels or voxels of the window for carrying out each of the filtering or preprocessing steps.

Also the above described variant of the method for coding pixels can be applied to a two dimensional and to a three dimensional image. Furthermore also in this case a fourth dimension can be considered in an analogous way as described for the principal embodiment, which fourth dimension consist in the time and allows taking into consideration the evolution in time of the image.

As an alternative after having carried out the m different filtering or processing algorithms on each pixel or voxel of the original image, each pixel or voxel of the original image can be coded in vector form having components consisting each in the singular value of a pixel or voxel window of the matrix of image data obtained by means of a corresponding filtering or processing algorithm. According to this the method comprises the following steps:

Providing a certain number of different filtering algorithms for the pixel or voxel of the original image;

Processing the pixel or voxel of the original image by means of each one of the different filtering algorithms and saving the resulting arrays of filtered pixel or voxels;

Defining a window centered or containing a target pixel or voxel and having a certain number of pixels or voxels surrounding the target pixel or voxel;

Calculating the singular value for the image data matrix corresponding to the windows of each pixel or voxel of each one of the arrays of filtered pixels or voxels;

coding each pixel or voxel by means of a vector which components correspond to the singular value of the image data matrix corresponding to the windows centered or containing the pixel or voxel in each one of the arrays of the filtered pixels or voxels obtained by each of the filtering algorithms.

Referring to the previous example in which a window was defined which was limited to only one pixel or voxel, namely the target pixel or voxel P(i,j) in the present case the window defined contains a certain number of pixels or voxels surrounding the target pixel or voxel, so that the component of the vector for coding the target pixel or voxel is not its filtered value but the singular value of the matrix of the values of the pixels or voxels which are part of the window.

The invention claimed is:

1. A method of coding pixels or voxels of a digital or digitalized two dimensional or three dimensional image, the method comprising the steps of:
   providing a digital image comprising a two dimensional array of pixels or a three dimensional array of voxels, each pixel or voxel being defined by at least one variable providing an intensity of the pixel or voxel in a grey scale image, or HSV (Hue, Saturation and Value), or RGB values in a color image;
   considering each pixel or voxel of the image as a target pixel or voxel, and forming for each target pixel or voxel a neighborhood defined by a pixel or voxel window comprising the said target pixel or voxel and a certain number of surrounding pixels or voxels; and
   for each target pixel or voxel generating a vector univocally associated to the target pixel or voxel, components of the vector being generated as a function of the intensity or values of the target pixel or voxel and of each of the pixels or voxels of the pixel or voxel window,
   wherein the function of the intensity or values of the target pixel or voxel and of each of the pixels or voxels of the pixel or voxel window corresponds to characteristic parameters of a numerical matrix representing the pixels or voxels of the window or of a transformation of the numerical matrix, and
   wherein the characteristic parameters are formed by singular values of the numerical matrix comprising image data of the pixels or voxels of the window.

2. The method according to claim 1, wherein the two dimensional and three dimensional image comprises a further dimension comprising time.

3. The method according to claim 1, wherein numerical data of the matrix representing the pixels or voxels of the image is subjected before coding the pixels or voxels to one or more preprocessing steps.

4. The method according to claim 3, wherein the one or more preprocessing steps comprise a filtering step.

5. The method according to claim 3, wherein the one or more preprocessing steps are carried out alternatively or in combination.

6. The method according to claim 3, wherein the one or more preprocessing steps are carried out by processing the numeric data representing each pixel or voxel of the digital or digitalized image with a cellular neural network.

7. A method of coding pixels or voxels of a digital or digitalized two dimensional or three dimensional image, the method comprising the steps of:
   providing a digital image comprising a two dimensional array of pixels or a three dimensional array of voxels, each pixel or voxel being defined by at least one variable providing an intensity of the pixel or voxel in a grey scale image, or HSV (Hue, Saturation and Value), or RGB values in a color image;
   considering each pixel or voxel of the image as a target pixel or voxel, and forming for each target pixel or voxel a neighborhood defined by a pixel or voxel window comprising the said target pixel or voxel and a certain number of surrounding pixels or voxels; and
   for each target pixel or voxel generating a vector univocally associated to the target pixel or voxel, components of the vector being generated as a function of the intensity or values of the target pixel or voxel and of each of the pixels or voxels of the pixel or voxel window,
   wherein the function of the intensity or values of the target pixel or voxel and of each of the pixels or voxels of the pixel or voxel window corresponds to characteristic parameters of a numerical matrix representing the pixels or voxels of the window or of a transformation of the numerical matrix, and
   wherein the function of the values of the target pixel or voxel and of each of the pixels or voxels of the pixel or voxel window corresponds to eigenvalues of a gradient matrix of the numerical matrix representing the pixels or voxels of the window, eigenvalues of a Hessian matrix of the numerical matrix representing the pixels or voxels of the window, or one or more or to a combination of coefficients of a wavelet transform of the numerical matrix representing the pixels or voxels of the window.

8. The method according to claim 7, wherein, in the coefficients of the wavelet transform, several wavelet basis functions are usable alternatively or in combination.

9. A method of coding pixels or voxels of a digital or digitalized two dimensional or three dimensional image, the method comprising the steps of:
   providing a digital image comprising a two dimensional array of pixels or a three dimensional array of voxels, each pixel or voxel being defined by at least one variable providing an intensity of the pixel or voxel in a grey scale image, or HSV (Hue, Saturation and Value), or RGB values in a color image;
   considering each pixel or voxel of the image as a target pixel or voxel, and forming for each target pixel or voxel a neighborhood defined by a pixel or voxel window comprising the said target pixel or voxel and a certain number of surrounding pixels or voxels; and
   for each target pixel or voxel generating a vector univocally associated to the target pixel or voxel, components of the vector being generated as a function of the intensity or values of the target pixel or voxel and of each of the pixels or voxels of the pixel or voxel window,
   wherein the function of the intensity or values of the target pixel or voxel and of each of the pixels or voxels of the pixel or voxel window corresponds to characteristic parameters of a numerical matrix representing the pixels or voxels of the window or of a transformation of the numerical matrix, and
   wherein a further function of the values of the target pixel or voxel and of each of the pixels or voxels of the pixel or voxel window corresponds to a co-occurrence transform of the matrix.

10. A method of coding pixels or voxels of a digital or digitalized two dimensional or three dimensional image, the method comprising the steps of:
   providing a digital image comprising a two dimensional array of pixels or a three dimensional array of voxels, each pixel or voxel being defined by at least one variable providing an intensity of the pixel or voxel in a grey scale image, or HSV (Hue, Saturation and Value), or RGB values in a color image;

considering each pixel or voxel of the image as a target pixel or voxel, and forming for each target pixel or voxel a neighborhood defined by a pixel or voxel window comprising the said target pixel or voxel and a certain number of surrounding pixels or voxels; and for each target pixel or voxel generating a vector univocally associated to the target pixel or voxel, components of the vector being generated as a function of the intensity or values of the target pixel or voxel and of each of the pixels or voxels of the pixel or voxel window, wherein the function of the intensity or values of the target pixel or voxel and of each of the pixels or voxels of the pixel or voxel window corresponds to characteristic parameters of a numerical matrix representing the pixels or voxels of the window or of a transformation of the numerical matrix, and wherein the function of the values of the target pixel or voxel and of each of the pixels or voxels of the pixel or voxel window corresponds to one or more coefficients of an autocorrelation transform of the numerical matrix representing the pixels or voxels of the window.

11. A method of coding pixels or voxels of a digital or digitalized two dimensional or three dimensional image, the method comprising the steps of:

providing a digital image comprising a two dimensional array of pixels or a three dimensional array of voxels, each pixel or voxel being defined by at least one variable providing an intensity of the pixel or voxel in a grey scale image, or HSV (Hue, Saturation and Value), or RGB values in a color image;

considering each pixel or voxel of the image as a target pixel or voxel, and forming for each target pixel or voxel a neighborhood defined by a pixel or voxel window comprising the said target pixel or voxel and a certain number of surrounding pixels or voxels; and for each target pixel or voxel generating a vector univocally associated to the target pixel or voxel, components of the vector being generated as a function of the intensity or values of the target pixel or voxel and of each of the pixels or voxels of the pixel or voxel window, wherein the function of the intensity or values of the target pixel or voxel and of each of the pixels or voxels of the pixel or voxel window corresponds to characteristic parameters of a numerical matrix representing the pixels or voxels of the window or of a transformation of the numerical matrix, and wherein each pixel or voxel is coded by a combination of eigenvalues or singular values of a matrix of numerical values representing one or more of the pixels or voxels of the windows, of the eigenvalues of a gradient matrix or of a Hessian matrix of the numerical matrix representing the pixels or voxels of the window, of one or more coefficients of a wavelet transform, of one or more coefficients of an autocorrelation transform, or of singular values of a co-occurrence matrix of said numerical matrix representing the pixels or voxels of the window.

12. A method of coding pixels or voxels of a digital or digitalized two dimensional or three dimensional image, the method comprising the steps of:

providing a digital image comprising a two dimensional array of pixels or a three dimensional array of voxels, each pixel or voxel being defined by at least one variable providing an intensity of the pixel or voxel in a grey scale image, or HSV (Hue, Saturation and Value), or RGB values in a color image;

considering each pixel or voxel of the image as a target pixel or voxel, and forming for each target pixel or voxel a neighborhood defined by a pixel or voxel window comprising the said target pixel or voxel and a certain number of surrounding pixels or voxels; and for each target pixel or voxel generating a vector univocally associated to the target pixel or voxel, components of the vector being generated as a function of the intensity or values of the target pixel or voxel and of each of the pixels or voxels of the pixel or voxel window, wherein the function of the intensity or values of the target pixel or voxel and of each of the pixels or voxels of the pixel or voxel window corresponds to characteristic parameters of a numerical matrix representing the pixels or voxels of the window or of a transformation of the numerical matrix, wherein numerical data of the matrix representing the pixels or voxels of the image is subjected before coding the pixels or voxels to one or more preprocessing steps, and wherein the one or more preprocessing steps comprise:

providing an artificial neural network comprising a n-dimensional array of cells ($K_i$) corresponding to knots of a neural network, each cell having connections to directly adjacent cells ($K_j$) forming the neighborhood of the a cell ($K_i$);

each cell ($K_i$) having an input for each connection to one or more of the directly adjacent cells ($K_j$);

each cell ($K_i$) having an output for a connection to one or more of the directly adjacent cells ($K_j$);

the connection between each cell ($K_i$) and the directly adjacent cells being determined by weights ($w_{ij}$);

each cell being further characterized by an internal value defined as an activation value or function ($A_i$) of the cell ($K_i$), each cell ($K_i$) being configured to carry out signal processing according to a signal processing function operating as a transfer function for generating a cell output signal ($u_i$);

the transfer function determining the output signal ($u_i$) of the cell ($K_i$) as a function of the activation value configured as a function ($A_i$) of the cell ($K_i$), the transfer function further comprising an identity function which puts the activation value of the cell ($K_i$) equal to the output signal ($u_i$) of the cell ($K_i$);

providing a n-dimensional database of input data records (Pi) for computation by the neural network, the relative position of the data records ($P_i$) in the n-dimensional database when projected in a corresponding n-dimensional space being a feature of the data records ($P_i$), the data records ($P_i$) of the database being configured to be represented by an array of points in the n-dimensional space, each point having a defined position in the array of points and being related to one of the data records ($P_i$) of the database, each data record ($P_i$) of the database further comprising at least one or more variables each having a certain value ($U_i$);

each data record ($P_i$) being associated to the cell ($K_i$) of the n-dimensional array of cells forming the neural network, the cell ($K_i$) having a same position in the n-dimensional array of cells ($K_i$) as the corresponding data record ($P_i$) represented by a point in the n-dimensional array of points;

the certain value ($U_i$) of the variables of each data record ($P_i$) being considered as an initialization value of the network and operating as the initial activation value ($A_i$) or an initial output value ($u_i$) of the cell ($K_i$); and the activation value ($A_i$) or the output value ($u_i$) of each cell ($K_i$) after a number of iterative processing steps of the neural network being considered as a new value ($U_i$) for the data records (Pi).

13. The method according to claim 12, wherein, for each processing step of the iterative processing steps, the weights ($w_{ij}$) defining one or more of the connections between each cell ($K_i$) and the directly adjacent cells ($K_j$) are determined as a function of current values ($U_j$) of the variables of each data record ($P_j$) associated to the cell of the directly adjacent cells ($U_j$) that is directly adjacent to the cell ($K_i$), the function of the current values being a learning function or rule.

14. The method according to claim 12, wherein the artificial neural network is modified by determining the current activation value ($A_i$) or the output value ($u_i$) of each cell ($K_i$) after one or more processing steps of the neural network so to provide a current new value ($U_i$) for the associated data records ($P_i$) that is a function of the weights ($w_{ij}$) defining the connection of the directly adjacent cells ($K_j$) with the cell ($K_i$), the function of the weights ($w_{ij}$) being an activation function or rule.

15. The method according to claim 14, wherein the current activation value ($A_i$) or the output value ($u_i$) of each cell ($K_i$) after one or more processing steps of the neural network operates as the current new value ($U_i$) for the associated data records ($P_i$) and is determined as a function of the current output values ($u_j$) of the directly adjacent cells ($K_j$) and of the corresponding weight ($w_{ij}$) defining the connection of the directly adjacent cells ($K_j$) with the cell ($K_i$), the function of the current output values ($u_j$) being an activation function or rule.

16. The method according to claim 12, wherein, for each processing step of the number of iterative processing steps, the weights ($w_{ij}$) defining the connection between each cell ($K_i$) and the directly adjacent cells ($K_j$) are determined as a function of the current values ($U_j$) of the variables of each data record ($P_j$) associated to the cell ($K_j$) directly adjacent to the cell ($K_i$) and of the current value ($U_i$) of the variables of the data record ($P_i$) associated to the cell ($K_i$).

17. A method of coding pixels or voxels of a digital or digitalized two dimensional or three dimensional image, the method comprising the steps of:

providing a digital image comprising a two dimensional array of pixels or a three dimensional array of voxels, each pixel or voxel being defined by at least one variable providing an intensity of the pixel or voxel in a grey scale image, or HSV (Hue, Saturation and Value), or RGB values in a color image;

considering each pixel or voxel of the image as a target pixel or voxel, and forming for each target pixel or voxel a neighborhood defined by a pixel or voxel window comprising the said target pixel or voxel and a certain number of surrounding pixels or voxels; and for each target pixel or voxel generating a vector univocally associated to the target pixel or voxel, components of the vector being generated as a function of the intensity or values of the target pixel or voxel and of each of the pixels or voxels of the pixel or voxel window, wherein the function of the intensity or values of the target pixel or voxel and of each of the pixels or voxels of the pixel or voxel window corresponds to characteristic parameters of a numerical matrix representing the pixels or voxels of the window or of a transformation of the numerical matrix, wherein numerical data of the matrix representing the pixels or voxels of the image is subjected before coding the pixels or voxels to one or more preprocessing steps, and wherein a plurality of filtering steps based on a plurality of filtering algorithms are carried out;

each filtering algorithm ($A_1, A_2, \ldots, A_m$) determining a transformation ($f_1, f_2, \ldots, f_m$) of the value or values of parameters defining an aspect of the pixels or voxels of the image;

for each pixel (P(i,j)) forming the two or three dimensional image defining a window comprising only the pixel (P(i,j)) or the voxel; and coding each pixel (P(i,j)) or each voxel or a selected number of pixels (P(i,j)) or of voxels of the image by a vector having components defined as the value or the values of the parameters of each pixel or of each voxel determined by the transformation ($f_1, f_2, \ldots, f_m$) of the original value or values of the parameters defining the pixel (P(i,j)) or the voxel.

18. The method according to claim 17, wherein the value or the values of the parameters of each pixel or of each voxel determined by the transformations ($f_1, f_2, \ldots, f_m$) of the original value or values of the parameters defining the pixel (P(i,j)) or the voxel are defined as a value or values of the pixel or voxel determined at a coordinate (i,j) or (i,j,z) of the array of parameters describing a pixel or voxel appearance of the two or three dimensional image.

19. The method according to claim 17, further comprising:

for each pixel (P(i,j)) or voxel forming the two or three dimensional image, defining a window comprising the pixel (P(i,j)) or the voxel and a certain number of surrounding pixels or voxels; and coding each pixel (P(i,j)) or each voxel or a selected number of pixels (P(i,j)) or voxels of the image by a vector having components defined as a singular value or singular values of a matrix of the parameters of each pixel or of each voxel inside the above defined windows and determined by the transformations ($f_1, f_2, \ldots, f_m$) of the original value or values of the parameters defining the pixel (P(i,j)) or voxel.

20. A method for processing digital or digitalized images, comprising the following steps:

providing a set of digital images of a known object, the digital images comprising a two dimensional array of pixels or a three dimensional array of voxels, each pixel or voxel being defined by at least one variable as an intensity of the pixel or voxel in a grey scale image, or HSV (Hue, Saturation and Value) or RGB values in a color image, each pixel or voxel of a digital image being a representation of a corresponding zone or part of an imaged object having a known quality or feature that is of interest and that is univocally associated to the pixel or voxel of the digital image;

coding each pixel or voxel of the digital image or of a subset of pixels or voxels of the digital image according to the method of claim 1 and univocally associating to each vector the known quality or feature of the zone or part of the imaged object to which the pixel or voxel of the digital mage corresponds, the voxel or pixel being represented by the vector;

providing a predictive algorithm;

carrying out training and testing of the predictive algorithm by using as input data the vectors univocally associated to each pixel or voxel of the images of the known objects and as output data the known quality or feature of the zone or part of the imaged object to which the pixel or voxel of the image corresponds and to which each of the vectors is univocally associated;

providing a digital image of an object, the digital image comprising a two dimensional array of pixels or a three dimensional array of voxels, each pixel or voxel being defined by at least one variable as the intensity in a grey scale image, or the HSV (Hue, Saturation and Value) or the RGB values in a color image, each pixel or voxel of the digital image being a representation of a corresponding zone or part of the imaged object, for which the quality or feature has to be determined;

coding each pixel or voxel of the digital image or of a subset of pixels or voxels of the digital image according to the method of claim 1 and obtaining for each coded pixel or voxel a vector univocally associated to the pixel or voxel; and for each or for part of the pixels or voxels of the digital image, feeding the components of the corresponding vector as input data of the trained and tested predictive algorithm;

wherein the quality or feature of the zone or part of an imaged body corresponds univocally to the pixel or voxel that is univocally coded by the vector, and wherein the components have been fed as input data to the predictive algorithm and are determined by the output data of the predictive algorithm.

21. The image processing method according to claim 20, wherein the predictive algorithm is an Artificial Neural Network.

22. The image processing method according to claim 20, wherein a plurality of different predictive algorithms are provided, and wherein the coded pixel or voxel is processed by each of the plurality of predictive algorithms, the output data being defined as a combination of the output data of each of the plurality of predictive algorithms.

23. The image processing method according to claim 20, further comprising the following steps:

defining a first window for carrying out the pixel or voxel coding, the first window comprising an array of pixels or voxels surrounding the target pixel or voxel to be coded and having a first dimension relating to the number of pixels of the first window;

carrying out the coding of the pixels or voxels;

providing a trained and tested predictive algorithm and carrying out a first processing of an image by employing the coded pixels or voxels according to the first window, thereby determining the feature or quality of each pixel or voxel in the image;

identifying the pixels or voxels in the image having a certain quality and their position in the image;

defining one or more sub-arrays of pixels or voxels corresponding to zones or parts of the original image in which the pixels or voxels having the certain quality are present;

defining a second window for carrying out the pixel or voxel coding, the second windows being formed by an array of pixels or voxels surrounding the target pixel or voxel to be coded has and having a second dimension relating to the number of pixels of the second window, the second dimension and number of pixels or voxels being bigger than that of the first window;

carrying out the pixel or voxel coding only for the pixels or voxels of the one or more sub-arrays of pixels or voxels corresponding to zones or parts of the original image in which the pixels or voxels having the certain quality are present; and carrying out a second processing of the pixels or voxels coded by using the second window with the trained and tested algorithm for determining the feature or quality of the pixels or voxels of the said sub-arrays of pixels or voxels which corresponds to zones or parts of the original image, in which the pixels or voxels having the certain quality are present according to the first processing step with the predictive algorithm.

24. The image processing method according to claim 23, wherein the first and the second windows for coding the pixels or voxels are configured also for coding the pixels or voxels of a dataset for training and testing the predictive algorithm for a certain corresponding processing step with the predictive algorithm, so that a correspondence exists between a window used for coding the pixels or voxels of the images of the training and testing dataset and the pixels or voxels of the image to be processed.

25. The image processing method according claim 23, wherein at each coding step of the pixels or voxels of the image to be processed or of the pixels or voxels corresponding to zones or parts of the original image, in which the pixels or voxels having the certain quality or feature determined by processing with the predictive algorithm are present, all or only part of parameters obtained by further transformations applied to an original matrix comprising numeric data of the pixels or voxels of the sub-array of pixels or voxels are addable to the components of the pixel or voxel coding vector.

26. The image processing method according to claim 25, wherein, for a first predictive processing step, the pixels or voxels are processed by coding the pixels or voxels using singular values of a matrix of intensity values, eigenvalues of a gradient matrix, and eigenvalues of a Hessian matrix of the matrix of the intensities of the pixels or voxels of a selected window, and wherein, for a subsequent processing step of the predictive algorithm in which only the pixels or voxels of one or more of the sub-arrays of pixels or voxels are processed, wherein the one or more sub-arrays correspond to zones or parts of the original image, in which the pixels or voxels having the certain quality are present according to the first processing step of the predictive algorithm, the pixels or voxels being represented by further numeric data corresponding to all or part of the parameters furnished by one or more further transforms of the matrix of the intensities of the pixels or voxels of a defined window.

27. The image processing method according to claim 26, wherein the transforms of the matrix of the intensities is an autocorrelation transform or a wavelet transform.

28. The image processing method according to claim 25, wherein at each processing step the dimension of the window is varied.

29. The image processing method according to claim 20, wherein at each processing step resolution of the image to be processed is varied.

30. The image processing method according to claim 20, wherein the images are two or three dimensional diagnostic images.

31. The image processing method according to claim 30, wherein the quality or feature of a zone or part of the imaged body represented by a pixel or voxel in the diagnostic image represents a bodily tissue imaged by the pixel or voxel.

32. The image processing method according to claim 20, wherein the image processing method is a method for computer aided diagnostics.

33. An image processing system provided in combination with an imaging apparatus and comprising:
- a computer hardware; and
- a software loadable in said computer hardware and executable by the said computer hardware,
- wherein the software is configured for carrying out the method according to claim 20.

34. The image processing system according to claim 33, wherein the computer hardware comprises an interface for communicating with a corresponding interface of the imaging apparatus, for receiving image data from the imaging apparatus, and for sending to the imaging apparatus information about the quality of a part of an object represented by the image data and commands for changing imaging resolution and/or field of view of a scanner of the imaging apparatus.

35. The image processing system according to claim 33, wherein the image processing system is a separate device form the imaging apparatus or is a device included in the imaging apparatus.

36. The image processing apparatus according to claim 35, wherein the computer hardware comprises the computer hardware of the imaging apparatus, and wherein the software is saved or loadable in the computer hardware of the imaging apparatus and is executable by the computer hardware.

37. An imaging apparatus comprising:
- a scanner for receiving signals form an object to be imaged,
- an image data processor for transforming the signals received by the scanner in image data to be displayed on a monitor,
- wherein further processing units are provided for carrying out the method according to claim 20 and for defining limited field of view images by graphic software and/or by varying the resolution of the scanner and/or by varying a dimension of a window of surrounding pixels around each target pixels, and
- wherein the processing unit comprises a memory in which a software is loadable for performing the method according to claim 24, the processing unit being configured to execute the software.

38. The imaging apparatus according to claim 37, wherein the imaging apparatus is an ecographic imaging apparatus, a MRI apparatus, or a radiologic apparatus.

* * * * *